US012277313B2

(12) United States Patent
Li

(10) Patent No.: US 12,277,313 B2
(45) Date of Patent: Apr. 15, 2025

(54) HANDWRITING DRAWING METHOD AND APPARATUS, ELECTRONIC DEVICE, AND READABLE STORAGE MEDIUM

(71) Applicant: Honor Device Co., Ltd., Shenzhen (CN)

(72) Inventor: Hang Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/271,468

(22) PCT Filed: Apr. 18, 2022

(86) PCT No.: PCT/CN2022/087496
§ 371 (c)(1),
(2) Date: Jul. 10, 2023

(87) PCT Pub. No.: WO2023/273526
PCT Pub. Date: Jan. 5, 2023

(65) Prior Publication Data
US 2024/0053880 A1 Feb. 15, 2024

(30) Foreign Application Priority Data
Jul. 2, 2021 (CN) .......................... 202110753694.6

(51) Int. Cl.
*G06F 3/04883* (2022.01)
*G06F 3/0354* (2013.01)
*G06F 3/044* (2006.01)

(52) U.S. Cl.
CPC ...... *G06F 3/04883* (2013.01); *G06F 3/03545* (2013.01); *G06F 3/044* (2013.01)

(58) Field of Classification Search
CPC .................... G06F 3/03545; G06F 3/04883
See application file for complete search history.

(56) References Cited

U.S. PATENT DOCUMENTS

| | | | | |
|---|---|---|---|---|
| 5,914,708 A | * | 6/1999 | LaGrange ........... | G06F 3/03545 178/19.03 |
| 9,632,595 B2 | * | 4/2017 | Park ..................... | G06F 3/0488 |

(Continued)

FOREIGN PATENT DOCUMENTS

| | | |
|---|---|---|
| CN | 102221955 A | 10/2011 |
| CN | 103605477 A | 2/2014 |

(Continued)

*Primary Examiner* — Daniel Rodriguez
(74) *Attorney, Agent, or Firm* — Leydig, Voit & Mayer, Ltd.

(57) ABSTRACT

This application provides a handwriting drawing method and apparatus, an electronic device, and a readable storage medium. The method is applied to the electronic device, the electronic device includes a touch screen, the touch screen includes a touch panel sensor (TP sensor), and the method includes: performing a handwriting drawing operation in response to detecting that a stylus moves close to the touch screen and a capacitance change amount of the TP sensor is greater than or equal to a first threshold; and stopping the handwriting drawing operation in response to detecting that the stylus moves away from the touch screen and that the capacitance change amount of the TP sensor is less than a second threshold, where the first threshold is different from the second threshold.

16 Claims, 13 Drawing Sheets

(56) References Cited

U.S. PATENT DOCUMENTS

| | | |
|---|---|---|
| 9,898,132 B2 | 2/2018 | Moon et al. |
| 2005/0140645 A1* | 6/2005 | Ueshima .............. A63F 13/00 345/156 |
| 2013/0257793 A1 | 10/2013 | Zeliff et al. |
| 2014/0210780 A1 | 7/2014 | Lee |
| 2015/0185909 A1 | 7/2015 | Gecnuk |
| 2015/0185923 A1 | 7/2015 | Yoon |
| 2016/0070371 A1* | 3/2016 | Oonishi .............. G06F 3/0446 345/174 |
| 2016/0195944 A1* | 7/2016 | Gur ................. G06F 3/0442 345/174 |
| 2016/0253041 A1* | 9/2016 | Park ................. G06F 3/0445 345/174 |
| 2016/0306496 A1* | 10/2016 | Ishikawa ............ G06F 3/0418 |
| 2016/0349897 A1* | 12/2016 | Ishikawa ............ G06F 3/0416 |
| 2016/0364023 A1* | 12/2016 | Bathiche ........... G06F 3/03545 |
| 2016/0364025 A1* | 12/2016 | Bernstein .......... G06F 3/04883 |
| 2018/0024656 A1* | 1/2018 | Kim ................ G06F 3/03545 345/174 |
| 2019/0235649 A1* | 8/2019 | Oyama ............... G06F 3/0383 |
| 2020/0050308 A1* | 2/2020 | Lee ................. G06F 3/0486 |
| 2020/0134890 A1* | 4/2020 | Zhang ............... G06F 3/03545 |
| 2020/0257003 A1 | 8/2020 | Zhu et al. |
| 2021/0165508 A1* | 6/2021 | Sugano .............. G06F 3/0383 |
| 2021/0224528 A1* | 7/2021 | Mannby ............. G06V 30/387 |
| 2022/0121318 A1* | 4/2022 | Chen ................ G06F 3/0442 |
| 2022/0137729 A1* | 5/2022 | Zou ................. G06F 3/04162 345/179 |

FOREIGN PATENT DOCUMENTS

| | | |
|---|---|---|
| CN | 103927062 A | 7/2014 |
| CN | 104065792 A | 9/2014 |
| CN | 105302398 A | 2/2016 |
| CN | 105933041 A | 9/2016 |
| CN | 111240499 A | 6/2020 |
| CN | 111381729 A | 7/2020 |
| CN | 112905035 A | 6/2021 |
| CN | 213338645 U | 6/2021 |
| JP | 201452988 A | 3/2014 |
| JP | 2016110302 A | 6/2016 |

* cited by examiner

HANDWRITING DRAWING METHOD AND APPARATUS, ELECTRONIC DEVICE, AND READABLE STORAGE MEDIUM

CROSS-REFERENCE TO RELATED APPLICATIONS

This application is a national stage of International Application No. PCT/CN2022/087496, filed on Apr. 18, 2022, which claims priority to Chinese Patent Application No. 202110753694.6, filed on Jul. 2, 2021. The disclosures of both of the aforementioned applications are hereby incorporated by reference in their entireties.

TECHNICAL FIELD

Embodiments of this application relate to terminal technologies, and in particular, to a handwriting drawing method and apparatus, an electronic device, and a readable storage medium.

BACKGROUND

With the development of touch technologies, more electronic devices perform human-computer interaction in a touch manner. For example, a user may provide an input to an electronic device by operating a touch screen of the electronic device through a stylus, and the electronic device performs a corresponding operation based on the input of the stylus.

Currently, the electronic device may display a handwriting of the stylus on the touch screen based on a pressure sensing signal of a stylus tip of the stylus and a touch panel (TP) signal from the stylus, to implement writing and drawing of the stylus on the touch screen. Currently, the electronic device has disadvantages such as a low response speed and low control precision during handwriting drawing, which easily leads to non-smooth writing and ink leakage.

SUMMARY

Embodiments of this application provide a handwriting drawing method and apparatus, an electronic device, and a readable storage medium, so as to improve a response speed and control precision of the electronic device during handwriting drawing.

According to a first aspect, an embodiment of this application provides a handwriting drawing method. An execution entity of the method may be an electronic device or a chip in an electronic device, and the following is described by using an example in which the execution entity is an electronic device. The electronic device includes a touch screen, the touch screen includes a touch panel sensor TP sensor, and when a user operates a stylus to draw a handwriting on the touch screen, different distances between the stylus and the touch screen may cause changes of a capacitance change amount of the TP sensor. Therefore, in this embodiment of this application, a first threshold and a second threshold of the capacitance change amount of the TP sensor may be preset, where the first threshold is different from the second threshold.

The electronic device may detect the capacitance change amount of the TP sensor, to determine whether to perform a handwriting drawing operation. The electronic device performs the handwriting drawing operation in response to detecting that the capacitance change amount of the TP sensor is greater than the first threshold, and stops the handwriting drawing operation in response to detecting that the capacitance change amount of the TP sensor is less than the second threshold.

In this embodiment of this application, the electronic device determines whether to perform the handwriting drawing operation based on the capacitance change amount of the TP sensor rather than based on a pressure sensing signal of a stylus tip of the stylus. Therefore, a Bluetooth transmission delay may be avoided, and a response speed of the electronic device during handwriting drawing is improved. In addition, a problem of low control precision of the electronic device caused by an inherent defect of a pressure sensor in the stylus tip of the stylus may be also avoided.

In this embodiment of this application, the electronic device determines whether to perform the handwriting drawing operation based on the capacitance change amount of the TP sensor, so that a handwriting can be also drawn by the stylus without pressure. That is, an objective that the electronic device draws a handwriting when the user holds the stylus and slightly touches the touch screen or writes obliquely is achieved.

In addition, in this embodiment of this application, a first threshold for the electronic device to draw a handwriting is set when the stylus moves close to the touch screen, and a second threshold for the electronic device to stop drawing a handwriting is set when the stylus moves away from the touch screen, thereby avoiding a ping-pong effect of the electronic device during handwriting drawing.

In a possible implementation, in this embodiment of this application, the preset first threshold is a threshold of the capacitance change amount when the user writes (that is, the stylus moves close to the touch screen), and the second threshold is a threshold of the capacitance change amount when the user lifts the stylus (that is, the stylus moves away from the touch screen). According to the setting, the electronic device may determine occasions to perform the handwriting drawing operation and stop the handwriting drawing operation more accurately when the user writes and lifts the stylus, thereby improving control accuracy of the electronic device. It should be understood that, the setting also has the technical effects in the foregoing embodiments.

In this implementation, the electronic device may perform the handwriting drawing operation in response to detecting that the stylus moves close to the touch screen and that the capacitance change amount of the TP sensor is greater than or equal to the first threshold; and the electronic device stops the handwriting drawing operation in response to detecting that the stylus moves away from the touch screen and that the capacitance change amount of the TP sensor is less than the second threshold, where the first threshold is different from the second threshold. It should be understood that, the electronic device performing the handwriting drawing operation may be understood as that the stylus writes, and the electronic device stopping the handwriting drawing operation may be understood as that the stylus does not write.

It should be understood that, the first threshold and the second threshold are obtained based on "the capacitance change amount of the TP sensor when the stylus is in contact with the touch screen", the first threshold is a capacitance change amount of the TP sensor when a distance between the stylus and the touch screen is a first distance, and the second threshold is a capacitance change amount of the TP sensor when the distance between the stylus and the touch screen is a second distance. For example, the first distance is 0.2 mm and the second distance is 0.5 mm. It should be noted that, a ratio of the first threshold to "the capacitance change amount of the TP sensor when the stylus is in contact with the touch screen" is a first ratio, and a ratio of the second threshold to "the capacitance change amount of the TP sensor when the stylus is in contact with the touch screen" is a second ratio.

In this embodiment of this application, the first threshold and the second threshold are set to different values, so that a ping-pong effect when the electronic device performs the handwriting drawing operation can be avoided. Similarly, it may be understood that, switching between writing and writing stopping of the stylus may be avoided, thereby avoiding a ping-pong effect of the stylus.

In an embodiment, when the user operates the stylus to draw a handwriting, stylus lifting cannot be avoided when the user draws strokes of text, but the user still needs to write. Therefore, if the second threshold is set to be excessively large, the electronic device stops handwriting drawing once the user lifts the stylus, leading to poor user experience. Therefore, in this embodiment of this application, the first threshold is set to be greater than the second threshold, when the user lifts the stylus and is spaced from the touch screen by a specific distance, the electronic device stops handwriting drawing. In this way, when the user really needs to stop writing, the electronic device may stop the handwriting drawing operation adaptively, which adapts to a drawing habit of the user and improves user experience.

The TP sensor includes a plurality of electrodes, and due to influence of an electrode manufacturing process, when the stylus is in contact with different positions of the touch screen of the electronic device, the capacitance change amount of the TP sensor differs. As a result, writing heights and stylus lifting heights of the stylus at different positions of the touch screen are remarkably different, leading to poor user experience.

First, in this embodiment of this application, in a production and manufacturing phase of the electronic device, a first threshold and a second threshold at each position of the touch screen may be obtained through pre-testing, and the first threshold and the second threshold at each position of the touch screen are stored in the electronic device. That is, a first threshold when the stylus is at a first position of the touch screen is different from a first threshold when the stylus is at a second position of the touch screen. Both the first position and the second position are positions on the touch screen.

Second, in this embodiment of this application, the electronic device may learn the first threshold and the second threshold at each position of the touch screen by itself, and store the first threshold and the second threshold at each position of the touch screen.

In this way, the electronic device may detect a position of the stylus on the touch screen in response to detecting that the stylus moves close to the touch screen, and further query the first threshold at the first position based on that the stylus is at the first position of the touch screen; and perform the handwriting drawing operation in response to that a capacitance change amount of the TP sensor at the first position is greater than or equal to the first threshold at the first position.

Correspondingly, the electronic device detects a position of the stylus on the touch screen in response to detecting that the stylus moves away from the touch screen; queries a second threshold at the first position based on that the stylus is at the first position of the touch screen; and stops the handwriting drawing operation in response to that a capacitance change amount of the TP sensor at the first position is less than the second threshold at the first position.

In this way, the electronic device may determine whether to perform the handwriting drawing operation by using the first threshold and the second threshold at the first position based on that the stylus is at the first position of the touch screen, thereby ensuring heights of writing and stylus lifting of the stylus at different positions of the touch screen are the same, and improving control accuracy of the electronic device during handwriting drawing.

The following describes a process that the electronic device performs self-learning and a process of querying the first threshold and the second threshold:

First

The electronic device may divide the touch screen into a first region and a second region, the first region includes at least one of the first position, and the second region includes at least one of the second position. It should be understood that, sizes and shapes of the first region and the second region may be the same or different.

The electronic device may record a first threshold in the first region in response to that the stylus is in contact with the first position, and record a first threshold in the second region in response to detecting that the stylus is in contact with the second position. Similarly, the electronic device may record a second threshold in the first region in response to that the stylus is in contact with the first position, and may record a second threshold in the second region in response to detecting that the stylus is in contact with the second position.

In this way, if the electronic device has learned the first threshold in the first region and the first region in the second region by itself, in a subsequent use process of the stylus, if the electronic device detects that the stylus is at the first position of the touch screen, the electronic device may use the first threshold in the first region as the first threshold at the first position.

In a possible implementation, if the touch screen further includes a third region, and the third region includes a third position, the electronic device may record a first threshold in the region to which the third position belongs in response to detecting that the stylus is in contact with the third position, where the third position is located outside the first region and the second region, that is, the first position is located outside the region to which the third position belongs. In this possible implementation, the electronic device has learned the first threshold in the third region by itself, but does not learn the first threshold in the first region and the first threshold in the second region.

In an embodiment, when the electronic device queries the first threshold at the first position in response to that the stylus is at the first position of the touch screen, the electronic device cannot query a stored first threshold. Therefore, the electronic device may use a preset first threshold as the first threshold at the first position. In an embodiment, if the electronic device cannot query a stored first threshold, the electronic device may alternatively use a first threshold at a position that is closest to the first position in stored first thresholds as the first threshold at the first position.

A manner that the electronic device may record a first threshold in the first region in response to that the stylus is in contact with the first position may be that: The electronic device obtains a capacitance change amount of the TP sensor at the first position in response to detecting that the stylus is in contact with the first position; and obtains the first threshold in the first region based on the capacitance change amount of the TP sensor at the first position and a first ratio.

The first region may include at least one of the first position, so that the electronic device may obtain a first threshold in a first region corresponding to each first position based on the capacitance change amount of the TP sensor at each first position and the first ratio; and obtain the first threshold in the first region based on the first threshold in the first region corresponding to each first position. For example, the first threshold in the first region is obtained based on the first threshold in the first region corresponding to each first position by using an average method or a weighted average method.

In a possible implementation, when a capacitance change amount of the TP sensor is obtained when the stylus is in contact with a position on the touch screen, the obtained capacitance change amount of the TP sensor may be preprocessed, to improve accuracy of the capacitance change amount of the TP sensor, thereby improving accuracy of the first threshold and the second threshold.

The electronic device may further receive a pressure sensing signal and a touch panel TP signal from the stylus when detecting that the stylus is in contact with the first position. The electronic device may obtain the capacitance change amount of the TP sensor at the first position in response to detecting that the stylus is in contact with the first position, a quantity of times of the pressure sensing signal is greater than a preset quantity of times, a quantity of point reporting of the TP signal is greater than a preset quantity, and an angle between the stylus and the touch screen is within a preset angle range. According to the setting, it may be ensured that the stylus stay on the touch screen for a long enough time, so that the electronic device obtains the capacitance change amount of the TP sensor more accurately when the stylus is in contact with the position, thereby improve accuracy of the first threshold and the second threshold at the position.

It should be understood that, in a process that the user uses the stylus, the stylus may be in contact with the first position and the second position for a plurality of times. The electronic device may obtain the first threshold at the first position based on the capacitance change amount of the TP sensor every time the stylus is in contact with the first position, to further update the first threshold at the first position.

Similarly, if the electronic device has learned the second threshold in the first region and the second threshold in the second region, in a subsequent use process of the stylus, if the electronic device detects that the stylus is at the first position of the touch screen, the electronic device may use the second threshold in the first region as the second threshold at the first position.

In a possible implementation, if the touch screen further includes a third region, and the third region includes a third position, the electronic device may record a second threshold in the region to which the third position belongs in response to detecting that the stylus is in contact with the third position, where the third position is located outside the first region and the second region. In this possible implementation, the electronic device has learned the second threshold in the third region by itself, but does not learn the second threshold in the first region and the second threshold in the second region. When the electronic device queries the second threshold at the first position in response to that the stylus is at the first position of the touch screen, the electronic device cannot query a stored second threshold.

Therefore, the electronic device may use a preset second threshold as the second threshold at the first position.

In an embodiment, if the electronic device cannot query a stored second threshold, the electronic device may alternatively use a second threshold at a position that is closest to the first position in stored second thresholds as the second threshold at the first position.

A manner that the electronic device may record a second threshold in the first region in response to that the stylus is in contact with the first position may be that: The electronic device obtains a capacitance change amount of the TP sensor at the first position in response to detecting that the stylus is in contact with the first position; and obtains the second threshold in the first region based on the capacitance change amount of the TP sensor at the first position and a second ratio.

The first region may include at least one of the first position, so that the electronic device may obtain a second threshold in a first region corresponding to each first position based on the capacitance change amount of the TP sensor at each first position and the second ratio; and obtain the second threshold in the first region based on the second threshold in the first region corresponding to each first position. For example, the second threshold in the first region is obtained based on the second threshold in the first region corresponding to each first position by using an average method or a weighted average method.

In a possible implementation, when a capacitance change amount of the TP sensor is obtained when the stylus is in contact with a position on the touch screen, the obtained capacitance change amount of the TP sensor may be preprocessed, to improve accuracy of the capacitance change amount of the TP sensor, thereby improving accuracy of the second threshold and the second threshold.

The electronic device may further receive a pressure sensing signal and a touch panel TP signal from the stylus when detecting that the stylus is in contact with the first position. The electronic device may obtain the capacitance change amount of the TP sensor at the first position in response to detecting that the stylus is in contact with the first position, a quantity of times of the pressure sensing signal is greater than a preset quantity of times, a quantity of point reporting of the TP signal is greater than a preset quantity, and an angle between the stylus and the touch screen is within a preset angle range. According to the setting, it may be ensured that the stylus stays on the touch screen for a long enough time, so that the electronic device obtains the capacitance change amount of the TP sensor more accurately when the stylus is in contact with the position, thereby improve accuracy of the second threshold and the second threshold at the position.

It should be understood that, in a process that the user uses the stylus, the stylus may be in contact with the first position and the second position for a plurality of times. The electronic device may obtain the second threshold at the first position based on the capacitance change amount of the TP sensor every time the stylus is in contact with the first position, to further update the second threshold at the first position.

Second

When the stylus is in contact with the first position, an angle between the stylus and the touch screen may affect the capacitance change amount of the TP sensor, and further affect the first threshold and the second threshold at the first position. To further improve the first threshold and the second threshold at each position of the touch screen that are learned by the electronic device by itself, the angle between the stylus and the touch screen may be taken into consideration.

The electronic device may obtain a first angle between the stylus and the touch screen in response to detecting that the stylus is in contact with the first position, and further record a first threshold under the first angle in the first region. Specifically, the electronic device may detect that the angle between the stylus and the touch screen is the first angle and the capacitance change amount of the TP sensor in response to detecting that the stylus is in contact with the first position. The electronic device may obtain the first threshold in the first region based on the capacitance change amount of the TP sensor at the first position and the first ratio and record the first threshold in the first region and the first angle correspondingly, to obtain the first threshold under the first angle in the first region.

Similarly, the electronic device may detect that the angle between the stylus and the touch screen is a second angle and the capacitance change amount of the TP sensor in response to detecting that the stylus is in contact with the second position. The electronic device may obtain the first threshold in the second region based on the capacitance change amount of the TP sensor at the second position and the first ratio and record the first threshold in the second region and the first angle correspondingly, to obtain a first threshold under the second angle in the second region.

In this manner, the electronic device may obtain the angle between the stylus and the touch screen in response to that the stylus is at the first position of the touch screen; and use the first threshold under the first angle in the first region as a first threshold under the first angle at the first position based on that the angle between the stylus and the touch screen is the first angle.

In a possible implementation, if the electronic device does not learn the first threshold under the first angle in the first region during self-learning, the electronic device may use a preset first threshold as the first threshold under the first angle at the first position.

In a possible implementation, if the electronic device does not learn the first threshold under the first angle in the first region during self-learning, the electronic device may use a first threshold under an angle that has a smallest difference with the first angle in the first region as the first threshold under the first angle at the first position.

In an embodiment, if the electronic device does not learn the first threshold under the first angle in the first region during self-learning, the electronic device may use a first threshold under an angle that is closest to the first position and is the same as or has a smallest difference with the first angle as the first threshold under the first angle at the first position.

It should be understood that, for a second threshold under each angle in each region on the touch screen, refer to related descriptions of the first threshold.

In this embodiment of this application, when the electronic device learns the first threshold and the second threshold in each region of the touch screen by itself, considering the influence of the angle between the stylus and the touch screen, the electronic device may learn the first threshold and the second threshold under each angle in each region of the touch screen by itself. Further, when the stylus draws a handwriting, the electronic device may query, based on a position of the stylus on the touch screen and an angle between the stylus and the touch screen, a first threshold and a second threshold under the angle at the position, thereby further improving control accuracy of a drawing comparison operation.

According to a second aspect, an embodiment of this application provides a handwriting drawing apparatus. The handwriting drawing apparatus may be the electronic device described in the first aspect or a chip in an electronic device, the electronic device includes a touch screen, and the touch screen includes a touch panel sensor TP sensor. The handwriting drawing apparatus includes: a processing module, configured to perform a handwriting drawing operation in response to detecting that a stylus moves close to the touch screen and a capacitance change amount of the TP sensor is greater than or equal to a first threshold, and stop the handwriting drawing operation in response to detecting that the stylus moves away from the touch screen and the capacitance change amount of the TP sensor is less than a second threshold, where the first threshold is different from the second threshold.

In a possible implementation, the first threshold is greater than the second threshold.

In a possible implementation, a first threshold when the stylus is at a first position of the touch screen is different from a first threshold when the stylus is at a second position of the touch screen.

In a possible implementation, the processing module is specifically configured to detect a position of the stylus on the touch screen in response to detecting that the stylus moves close to the touch screen; query the first threshold at the first position based on that the stylus is at the first position of the touch screen; and perform the handwriting drawing operation in response to that a capacitance change amount of the TP sensor at the first position is greater than or equal to the first threshold at the first position.

In a possible implementation, the processing module is specifically configured to detect a position of the stylus on the touch screen in response to detecting that the stylus moves away from the touch screen; query a second threshold at the first position based on that the stylus is at the first position of the touch screen; and stop the handwriting drawing operation in response to that a capacitance change amount of the TP sensor at the first position is less than the second threshold at the first position.

In a possible implementation, the touch screen includes a first region and a second region, the first region includes at least one of the first position, and the second region includes at least one of the second position. In a possible implementation, a storage module is configured to record a first threshold in the first region in response to detecting that the stylus is in contact with the first position, and record a first threshold in the second region in response to detecting that the stylus is in contact with the second position.

In a possible implementation, the processing module is specifically configured to use the first threshold in the first region as the first threshold at the first position.

In a possible implementation, the storage module is further configured to record a first threshold in a region to which a third position belongs in response to detecting that the stylus is in contact with the third position, where the third position is located outside the first region and the second region.

The processing module is specifically configured to use a preset first threshold as the first threshold at the first position.

In a possible implementation, the processing module is specifically configured to obtain the capacitance change amount of the TP sensor at the first position in response to detecting that the stylus is in contact with the first position;

and obtain the first threshold in the first region based on the capacitance change amount of the TP sensor at the first position and a first ratio.

In a possible implementation, the processing module is specifically configured to obtain a first threshold in a first region corresponding to each first position based on the capacitance change amount of the TP sensor at each first position and the first ratio; and obtain the first threshold in the first region based on the first threshold in the first region corresponding to each first position.

In a possible implementation, a transceiver module is configured to receive a pressure sensing signal and a touch panel TP signal from the stylus.

The processing module is specifically configured to obtain the capacitance change amount of the TP sensor at the first position in response to detecting that the stylus is in contact with the first position, a quantity of times of the pressure sensing signal is greater than a preset quantity of times, a quantity of point reporting of the TP signal is greater than a preset quantity, and an angle between the stylus and the touch screen is within a preset angle range.

In a possible implementation, the storage module is further configured to replace or update the first threshold in the first region.

In a possible implementation, the processing module is configured to detect the angle between the stylus and the touch screen in response to detecting that the stylus is in contact with the first position.

The storage module is configured to record a first threshold under a first angle in the first region based on that the angle between the stylus and the touch screen is the first angle.

The processing module is further configured to detect the angle between the stylus and the touch screen in response to detecting that the stylus is in contact with the second position; and the storage module is further configured to record a first threshold under a second angle in the first region based on that the angle between the stylus and the touch screen is the second angle.

In a possible implementation, the processing module is further configured to detect the angle between the stylus and the touch screen in response to detecting that the stylus is at the first position of the touch screen; and use the first threshold under the first angle in the first region as the first threshold at the first position based on that the angle between the stylus and the touch screen is the first angle.

According to a third aspect, an embodiment of this application provides an electronic device, including a processor and a memory, where the memory is configured to store code and instructions; and the processor is configured to execute the code and instructions, to cause the electronic device to perform the method in the first aspect or any implementation of the first aspect.

According to a fourth aspect, an embodiment of this application provides a handwriting drawing system, including the electronic device described in the third aspect and a stylus.

According to a fifth aspect, an embodiment of this application provides a computer-readable storage medium. The computer-readable storage medium stores instructions, and when the instructions are executed, a computer is caused to perform the method in the first aspect or any implementation of the first aspect.

According to a sixth aspect, an embodiment of this application provides a computer program product, including a computer program. When the computer program is executed, a computer is caused to perform the method in the first aspect or any implementation of the first aspect.

It should be understood that technical solutions of the second aspect to the sixth aspect of this application correspond to those of the first aspect of this application, beneficial effects achieved in these aspects and corresponding feasible implementations are similar, and details are not described again.

DESCRIPTION OF EMBODIMENTS

Figure 1:
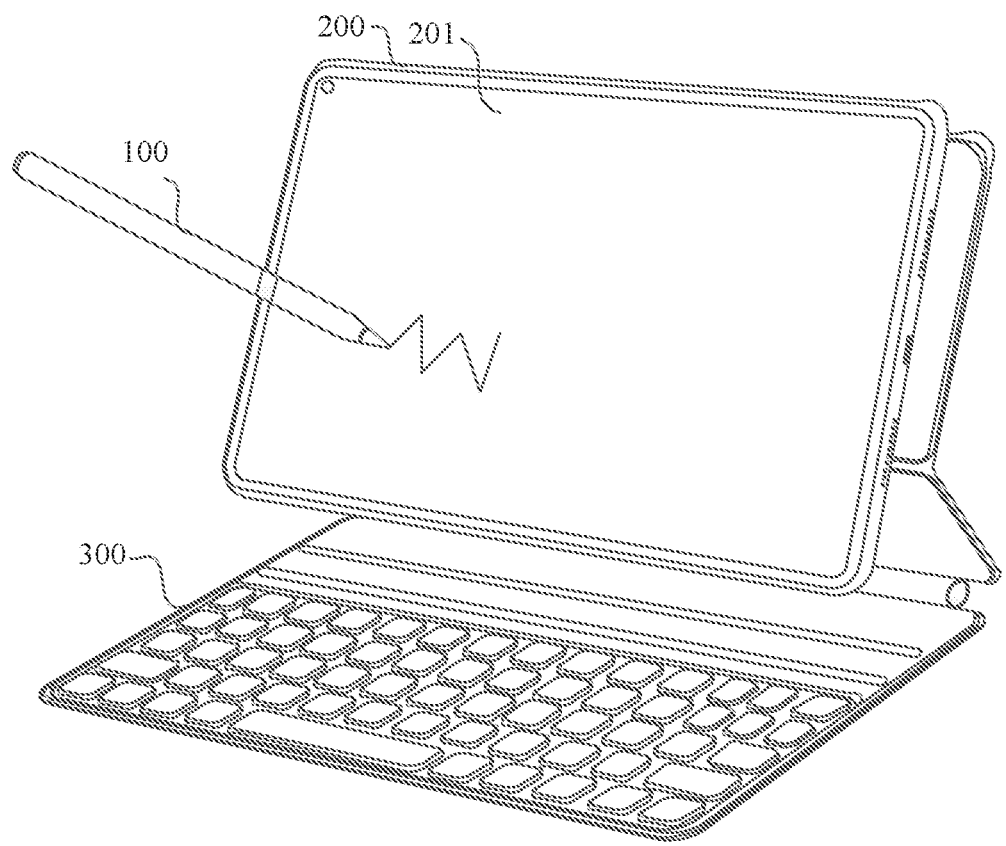
FIG. 1 is a schematic diagram of a scenario to which an embodiment of this application is applicable.

FIG. 1 is a schematic diagram of a scenario to which an embodiment of this application is applicable. Referring to FIG. 1, the scenario includes a stylus 100, an electronic device 200, and a wireless keyboard 300. In FIG. 1, an example in which the electronic device 200 is a tablet is used for description. The stylus 100 and the wireless keyboard 300 may provide an input to the electronic device 200. The electronic device 200 performs an operation in response to the input based on the input of the stylus 100 or the wireless keyboard 300. A touch region may be disposed on the wireless keyboard 300. The stylus 100 may operate the touch region of the wireless keyboard 300 to provide an input to the wireless keyboard 300, and the wireless keyboard 300 may perform an operation in response to the input based on the input of the stylus 100. In an embodiment, the stylus 100 and the electronic device 200, the stylus 100 and the wireless keyboard 300, and the electronic device 200 and the wireless keyboard 300 may be interconnected through a communication network, to implement interaction of wireless signals. The communication network may be, but is not limited to, a short-range communication network such as a Wi-Fi hotspot network, a Wi-Fi peer-to-peer (P2P) network, a Bluetooth network, a zigbee network, or a near field communication (NFC) network.

The stylus 100 may be, but is not limited to, an inductive stylus and a capacitive stylus. The electronic device 200 includes a touch screen 201. When the stylus 100 is the inductive stylus, an electromagnetic induction board needs to be integrated on the touch screen 201 of the electronic device 200 interacting with the stylus 100. A coil is distributed on the electromagnetic induction board, and a coil is also integrated in the inductive stylus. Based on the principle of electromagnetic induction, within a range of a magnetic field generated by the electromagnetic induction board, the inductive stylus can accumulate electric energy with movement of the inductive stylus. The inductive stylus can transmit the accumulated electric energy to the electromagnetic induction board through the coil in the inductive stylus by free oscillation. The electromagnetic induction board may scan the coil on the electromagnetic induction board based on the electric energy from the inductive stylus, and calculate a position of the inductive stylus on the touch screen 201. The touch screen in the electronic device 200 may also be referred to as a touchscreen, and the stylus may be referred to as a stylus.

The capacitive stylus may include a passive capacitive stylus and an active capacitive stylus. The passive capacitive stylus may be referred to as a passive capacitive stylus, and the active capacitive stylus may be referred to as an active capacitive stylus.

One or more electrodes may be disposed in the active capacitive stylus (for example, a stylus tip). The active capacitive stylus may transmit a signal through the electrode. When the stylus 100 is the active capacitive stylus, an electrode array needs to be integrated on the touch screen 201 of the electronic device 200 interacting with the stylus 100. In an embodiment, the electrode array may be a capacitive electrode array. The electronic device 200 may receive a signal from the active capacitive stylus through the electrode array, and when receiving the signal, identify a position of the active capacitive stylus on the touch screen and an inclination angle of the active capacitive stylus based on a change in a capacitance value on the touch screen 201. It should be understood that, the stylus used in this embodiment of this application is the active capacitive stylus, which may be referred to as an active stylus.

Figure 2A:
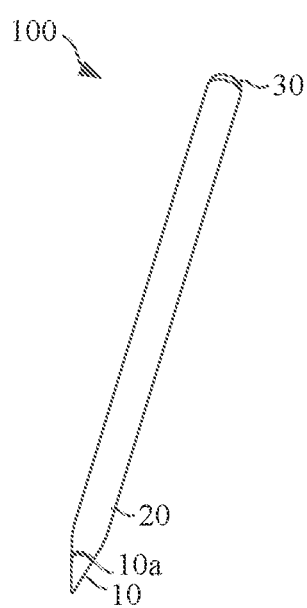
FIG. 2A is a schematic diagram of a structure of a stylus according to an embodiment of this application.

FIG. 2A is a schematic diagram of a structure of a stylus according to an embodiment of this application. Referring to FIG. 2A, the stylus 100 may include a stylus tip 10, a stylus rod 20, and a rear cover 30. The inside of the stylus rod 20 is of a hollow structure. The stylus tip 10 and the rear cover 30 are respectively located at two ends of the stylus rod 20. The rear cover 30 and the stylus rod 20 may be connected through plugging or snapping. For a fitting relationship between the stylus tip 10 and the stylus rod 20, refer to descriptions in FIG. 2B.

Figure 2B:
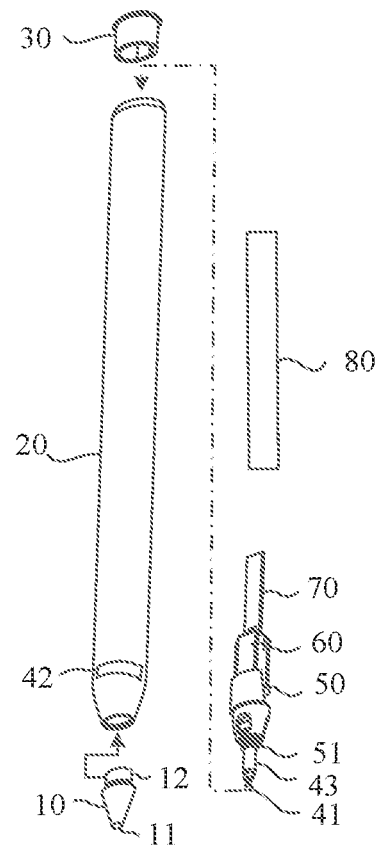
FIG. 2B is a schematic diagram of a partially split structure of a stylus according to an embodiment of this application.

FIG. 2B is a schematic diagram of a partially split structure of a stylus according to an embodiment of this application. Referring to FIG. 2B, the stylus 100 further includes a main shaft component 50. The main shaft component 50 is located in the stylus rod 20, and the main shaft component 50 is slidably disposed in the stylus rod 20. The main shaft component 50 has an external thread 51, and the stylus tip 10 includes a writing end 11 and a connection end 12. The connection end 12 of the stylus tip 10 has an internal thread (not shown) fitting the external thread 51.

When the main shaft component 50 is assembled into the stylus rod 20, the connection end 12 of the stylus tip 10 extends into the stylus rod 20 and is threadedly connected to the external thread 51 of the main shaft component 50. In some other examples, the connection end 12 of the stylus tip 10 may alternatively be connected to the main shaft component 50 in a detachable manner, for example, snap-fitting. The connection end 12 of the stylus tip 10 is detachably connected to the main shaft component 50, to implement replacement of the stylus tip 10.

To detect pressure applied to the writing end 11 of the stylus tip 10, as shown in FIG. 2A, there is a gap 10a between the stylus tip 10 and the stylus rod 20. In this way, it can be ensured that when the writing end 11 of the stylus tip 10 is subject to an external force, the stylus tip 10 can move toward the stylus rod 20, and movement of the stylus tip 10 drives the main shaft component 50 to move in the stylus rod 20. To detect the external force, as shown in FIG. 2B, a pressure sensing component 60 is disposed on the main shaft component 50. A part of the pressure sensing component 60 is fixedly connected to a fastener in the stylus rod 20, and a part of the pressure sensing component 60 is fixedly connected to the main shaft component 50. In this way, when the main shaft component 50 moves with the stylus tip 10, because the part of the pressure sensing component 60 is fixedly connected to the fastener in the stylus rod 20, movement of the main shaft component 50 drives the pressure sensing component 60 to deform, and deformation of the pressure sensing component 60 is transmitted to a circuit board 70 (for example, the pressure sensing component 60 and the circuit board 70 may be electrically connected through a wire or a flexible circuit board). The circuit board 70 measures the pressure of the writing end 11 of the stylus tip 10 based on the deformation of the pressure sensing component 60, and therefore controls a line thickness of the writing end 11 based on the pressure of the writing end 11 of the stylus tip 10.

It should be noted that, detection on the pressure of the stylus tip 10 includes but is not limited to the foregoing method. For example, a pressure sensor may be further disposed in the writing end 11 of the stylus tip 10, and the pressure of the stylus tip 10 is detected by the pressure sensor.

In this embodiment, as shown in FIG. 2B, the stylus 100 further includes a plurality of electrodes. The plurality of electrodes may be, for example, a first transmit electrode 41, a ground electrode 43, and a second transmit electrode 42. The first transmit electrode 41, the ground electrode 43, and the second transmit electrode 42 are electrically connected to the circuit board 70. The first transmit electrode 41 may be located in the stylus tip 10 and close to the writing end 11. The circuit board 70 may be configured as a control board that provides a signal to each of the first transmit electrode 41 and the second transmit electrode 42, and the first transmit electrode 41 is configured to transmit a first signal. When the first transmit electrode 41 moves close to the touch screen 201 of the electronic device 200, a coupling capacitance may be formed between the first transmit electrode 41 and the touch screen 201 of the electronic device 200, so that the electronic device 200 can receive the first signal. The second transmit electrode 42 is configured to transmit a second signal, and the electronic device 200 may determine an inclination angle of the stylus 100 based on the received second signal. In this embodiment of this application, the second transmit electrode 42 may be located on an inner wall of the stylus rod 20. In an example, the second transmit electrode 42 may alternatively be located on the main shaft component 50.

The ground electrode 43 may be located between the first transmit electrode 41 and the second transmit electrode 42, or the ground electrode 43 may be located around an outer periphery of the first transmit electrode 41 and the second transmit electrode 42, and the ground electrode 43 is configured to reduce coupling between the first transmit electrode 41 and the second transmit electrode 42.

When the electronic device 200 receives the first signal from the stylus 100, a capacitance value at a corresponding position on the touch screen 201 changes. Based on this, the electronic device 200 may determine a position of the stylus 100 (or the stylus tip of the stylus 100) on the touch screen 201 based on the change in the capacitance value on the touch screen 201. In addition, the electronic device 200 may obtain the inclination angle of the stylus 100 by using a double-stylus tip projection method in an inclination angle detection algorithm. Because positions of the first transmit electrode 41 and the second transmit electrode 42 in the stylus 100 are different, when the electronic device 200 receives the first signal and the second signal from the stylus 100, capacitance values at the two positions on the touch screen 201 change. The electronic device 200 may obtain the inclination angle of the stylus 100 based on a distance between the first transmit electrode 41 and the second transmit electrode 42 and a distance between the two positions at which the capacitance values on the touch screen 201 change. For more detailed descriptions of obtaining the inclination angle of the stylus 100, refer to related descriptions of the double-stylus tip projection method in the conventional technology.

In this embodiment of this application, as shown in FIG. 2B, the stylus 100 further includes a battery component 80, where the battery component 80 is configured to provide power to the circuit board 70. The battery component 80 may include a lithium ion battery, or the battery component 80 may include a nickel chromium battery, an alkaline battery, or a nickel hydrogen battery. In an embodiment, a battery included in the battery component 80 may be a rechargeable battery or a disposable battery. When the battery included in the battery component 80 is the rechargeable battery, the stylus 100 may charge the battery in the battery component 80 through wireless charging.

Figure 3:
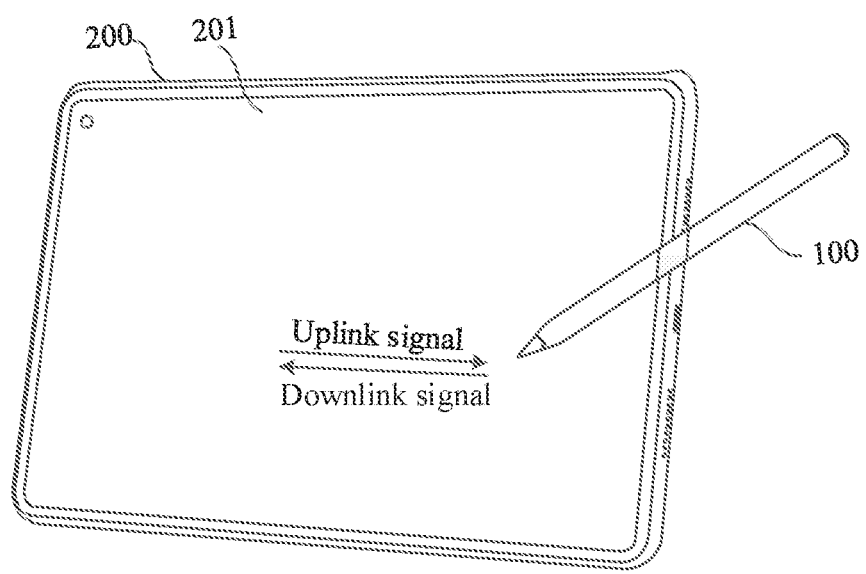
FIG. 3 is a schematic diagram of interaction between a stylus and an electronic device according to an embodiment of this application.

When the stylus 100 is an active capacitive stylus, as shown in FIG. 3, after the electronic device 200 is wirelessly connected to the stylus 100, the electronic device 200 may send an uplink signal to the stylus 100 through the electrode array integrated on the touch screen 201. The stylus 100 may receive the uplink signal through a receive electrode, and the stylus 100 transmits a downlink signal through a transmit electrode (for example, the first transmit electrode 41 and the second transmit electrode 42). The downlink signal includes the foregoing first signal and second signal. When the stylus tip 10 of the stylus 100 is in contact with the touch screen 201, the capacitance value at the corresponding position on the touch screen 201 changes, and the electronic device 200 may determine a position of the stylus tip 10 of the stylus 100 on the touch screen 201 based on the capacitance value on the touch screen 201. In an embodiment, the uplink signal and the downlink signal may be square wave signals.

Figure 4:
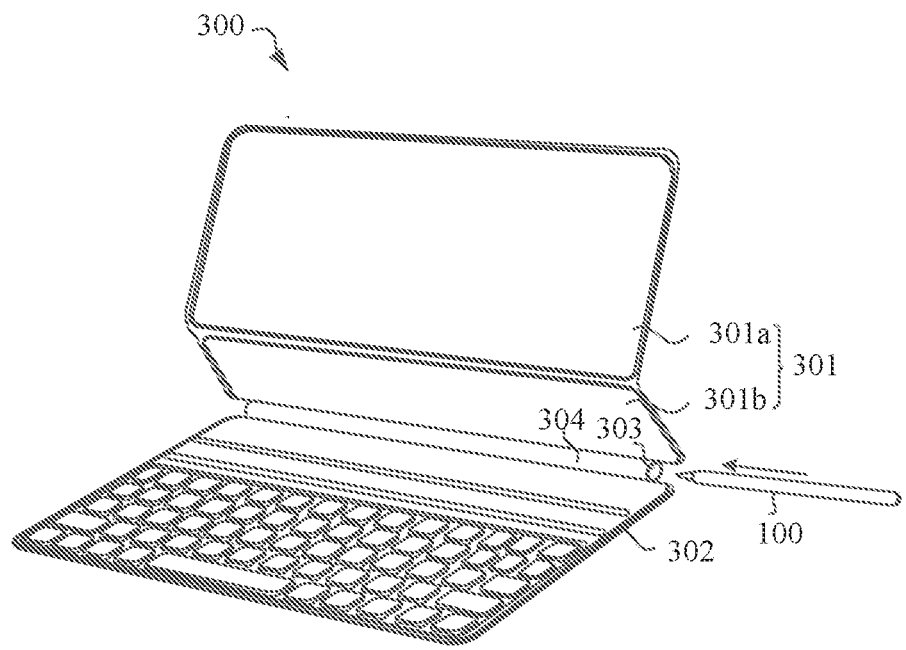
FIG. 4 is a schematic diagram of assembly of a stylus and a wireless keyboard according to an embodiment of this application.

In an embodiment, as shown in FIG. 4, the wireless keyboard 300 may include a first part 301 and a second part 302. For example, the wireless keyboard 300 may include a keyboard body and a keyboard cover. The first part 301 may be the keyboard cover, and the second part 302 is the keyboard body. The first part 301 is configured to place the electronic device 200, and the second part 302 may be provided with a key or a touch pad for a user operation.

When the wireless keyboard 300 is used, the first part 301 and the second part 302 of the wireless keyboard 300 need to be opened. When the wireless keyboard 300 is not used, the first part 301 and the second part 302 of the wireless keyboard 300 can be closed. In an embodiment, the first part 301 and the second part 302 of the wireless keyboard 300 are rotatably connected to each other. For example, the first part 301 and the second part 302 may be connected through a rotating shaft or a hinge. Alternatively, in some examples, the first part 301 and the second part 302 are rotationally connected by using a flexible material (for example, a leather material or a cloth material). Alternatively, in some examples, the first part 301 and the second part 302 may be integrally formed, and a joint between the first part 301 and the second part 302 is thinned, so that the joint between the first part 301 and the second part 302 may be bent. A connection manner between the first part 301 and the second part 302 may include but is not limited to the foregoing rotatable connection manners.

The first part 301 may include at least two rotationally connected supports. For example, as shown in FIG. 4, the first part 301 includes a first support 301a and a second support 301b. The first support 301a and the second support 301b are rotatably connected to each other. During use, the first support 301a and the second support 301b may be used to jointly support the electronic device 200 (for details, refer to FIG. 1). Alternatively, the first support 301a supports the second support 301b, and the second support 301b supports the electronic device 200. As shown in FIG. 4, the second support 301b and the second part 302 are rotatably connected to each other.

As shown in FIG. 4, to accommodate the stylus 100, the wireless keyboard 300 may be provided with an accommodating portion 303 for accommodating the stylus 100. As shown in FIG. 4, the accommodating portion 303 is a cylindrical cavity. During accommodating, the stylus 100 is inserted into the accommodating cavity along an arrow direction in FIG. 4. In this embodiment, as shown in FIG. 4, the second part 302 and the second support 301b are rotatably connected to each other through a connection portion 304, and the accommodating portion 303 is disposed in the connection portion 304. The connection portion 304 may be a rotating shaft.

Figure 5A:
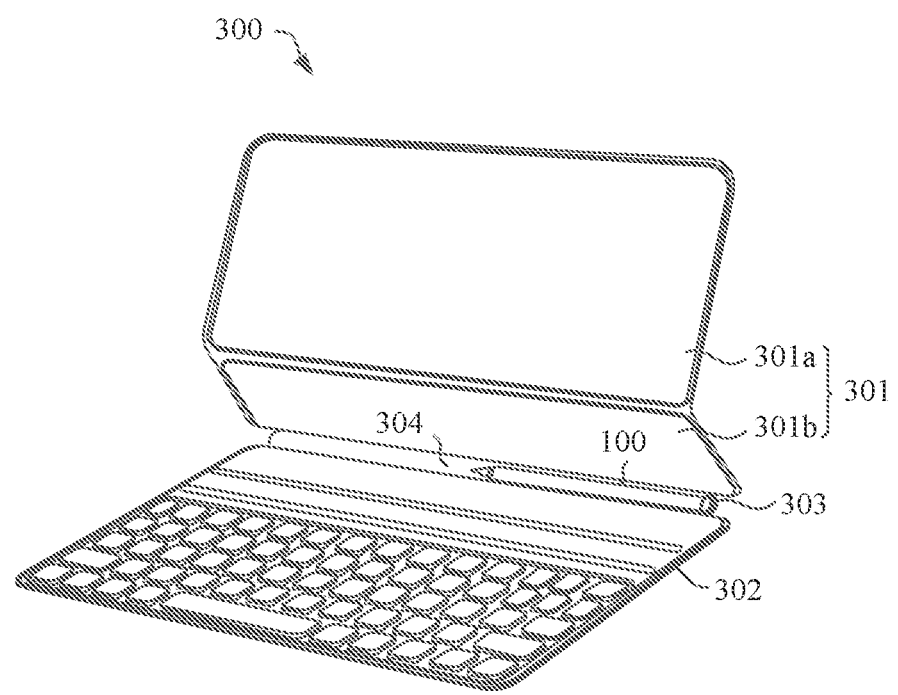
FIG. 5A is a schematic diagram of a stylus being accommodated in an accommodating portion of a wireless keyboard according to an embodiment of this application.
Figure 5B:
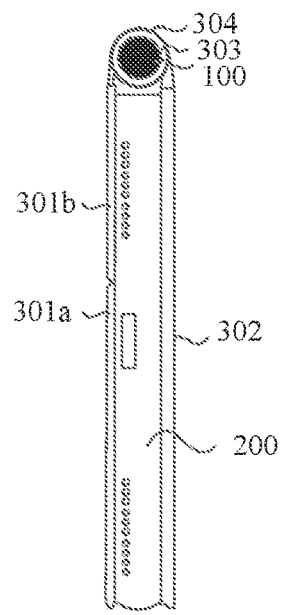
FIG. 5B is a schematic side view of a stylus being accommodated in an accommodating portion of a wireless keyboard according to an embodiment of this application.

FIG. 5A is a schematic diagram of a stylus being accommodated in an accommodating portion of a wireless keyboard according to an embodiment of this application. FIG. 5B is a schematic side view of a stylus being accommodated in an accommodating portion of a wireless keyboard according to an embodiment of this application. As shown in FIG. 5B, the accommodating portion 303 is a circular cavity, and an inner diameter of the accommodating portion 303 is greater than an outer diameter of the stylus 100.

In an embodiment, a magnetic material may be disposed on an inner wall of the accommodating portion 303, and a magnetic material may be disposed in the stylus 100, to prevent the stylus 100 from falling out of the accommodating portion 303. The stylus 100 is adsorbed in the accommodating portion 303 through magnetic adsorption between the magnetic materials. Certainly, in some examples, the stylus 100 may be fastened to the accommodating portion 303 by, but is not limited to, magnetic adsorption. For example, the stylus 100 may alternatively be fastened to the accommodating portion 303 through snapping.

To help the stylus 100 to be taken out of the accommodating portion 303, an eject structure may be disposed in the accommodating portion 303. For example, one end of the stylus 100 is pressed, so that an eject mechanism can drive one end of the stylus 100 to eject from the accommodating portion 303.

Figure 6:
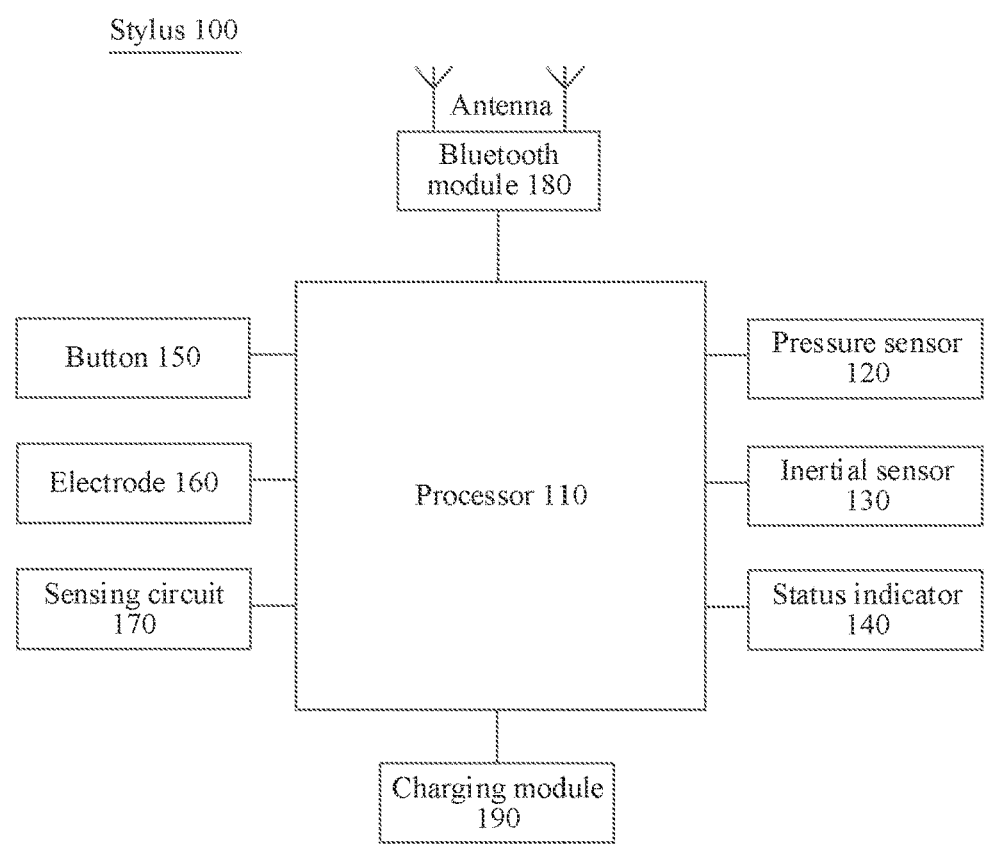
FIG. 6 is a schematic diagram of a hardware structure of a stylus according to an embodiment of this application.

FIG. 6 is a schematic diagram of a hardware structure of a stylus according to an embodiment of this application. As shown in FIG. 6, the stylus 100 may include a processor 110. The processor 110 may include storage and processing circuits configured to support operations of the stylus 100. The storage and processing circuits may include a storage apparatus such as a non-volatile memory (for example, a flash memory or another electrically programmable read-only memory configured as a solid-state drive) and a volatile memory (for example, a static or dynamic random access memory). The processing circuit in the processor 110 may be configured to control an operation of the stylus 100. The processing circuit may be based on one or more microprocessors, microcontrollers, digital signal processors, baseband processors, power management units, audio chips, or application-specific integrated circuits.

The stylus 100 may include one or more sensors. For example, the sensor may include a pressure sensor 120. The pressure sensor 120 may be disposed at the writing end 11 of the stylus 100 (as shown in FIG. 2B). Certainly, the pressure sensor 120 may alternatively be disposed in the stylus rod 20 of the stylus 100, so that after one end of the stylus tip 10 of the stylus 100 is subject to a force, an other end of the stylus tip 10 moves to apply the force to the pressure sensor 120. In an embodiment, the processor 110 may adjust a line thickness of the stylus tip 10 of the stylus 100 during writing based on a pressure detected by the pressure sensor 120.

The sensor may also include an inertial sensor 130. The inertial sensor 130 may include a three-axis accelerometer and a three-axis gyroscope, and/or other components configured to measure movement of stylus 100. For example, a three-axis magnetometer may be included in the sensor in a configuration of a nine-axis inertial sensor. The sensor may also include an additional sensor such as a temperature sensor, an ambient light sensor, a light-based proximity sensor, a contact sensor, a magnetic sensor, a pressure sensor, and/or other sensors.

The stylus 100 may include a status indicator 140 such as a light-emitting diode and a button 150. The status indicator 140 is configured to prompt a user of a status of the stylus 100. The button 150 may include a mechanical button and a non-mechanical button, and the button 150 may be configured to collect button pressing information from the user.

In this embodiment of this application, the stylus 100 may include one or more electrodes 160 (for details, refer to the descriptions in FIG. 2B), one electrode 160 may be located at the writing end of the stylus 100, and one electrode 160 may be located in the stylus tip 10. For details, refer to the foregoing related descriptions.

The stylus 100 may include a sensing circuit 170. The sensing circuit 170 may sense capacitive coupling between the electrode 160 and a drive line of a capacitive touch sensor panel that interacts with the stylus 100. The sensing circuit 170 may include an amplifier configured to receive a capacitance reading from the capacitive touch sensor panel, a clock configured to generate a demodulation signal, a phase shifter configured to generate a phase-shifted demodulation signal, a mixer configured to demodulate the capacitance reading by using an in-phase demodulation frequency component, and a mixer configured to demodulate the capacitance reading by using a quadrature demodulation frequency component. A demodulation result of the mixer may be used for determining an amplitude proportional to a capacitance, so that the stylus 100 can sense contact with the capacitive touch sensor panel.

It may be understood that, based on an actual requirement, the stylus 100 may include a microphone, a speaker, an audio generator, a vibrator, a camera, a data port, and other devices. The user may use these devices to provide commands to control operations of the stylus 100 and the electronic device 200 interacting with the stylus 100, and receive status information and other outputs.

The processor 110 may be configured to run software on the stylus 100 that controls the operations of the stylus 100. In an operation process of the stylus 100, software running on the processor 110 may process sensor inputs, button inputs, and inputs from other apparatuses to monitor movement of the stylus 100 and other user inputs. The software running on the processor 110 may detect a user command and may communicate with the electronic device 200.

In order to support wireless communication between the stylus 100 and the electronic device 200, the stylus 100 may include a wireless module. In FIG. 6, an example in which the wireless module is a Bluetooth module 180 is used for description. The wireless module may alternatively be a Wi-Fi hotspot module or a Wi-Fi peer-to-peer module. The Bluetooth module 180 may include a radio frequency transceiver, for example, a transceiver. The Bluetooth module 180 may alternatively include one or more antennas. The transceiver may transmit and/or receive a wireless signal by using the antenna. The wireless signal may be a Bluetooth signal, a wireless local area network signal, a remote signal such as a cellular telephone signal, a near field communication signal, or other wireless signals based on a type of the wireless module.

The stylus 100 may further include a charging module 190, and the charging module 190 may support charging of the stylus 100 and provide power to the stylus 100.

It should be understood that the electronic device 200 in this embodiment of this application may be referred to as a user equipment (UE) or a terminal. For example, the electronic device 200 may be a mobile terminal or a fixed terminal including a touch screen, for example, a portable Android® device (PAD), a personal digital assistant (PDA), a handheld device having a wireless communication function, a computing device, an in-vehicle device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, or a wireless terminal in a smart home. A form of the terminal device is not specifically limited in this embodiment of this application.

Figure 7:
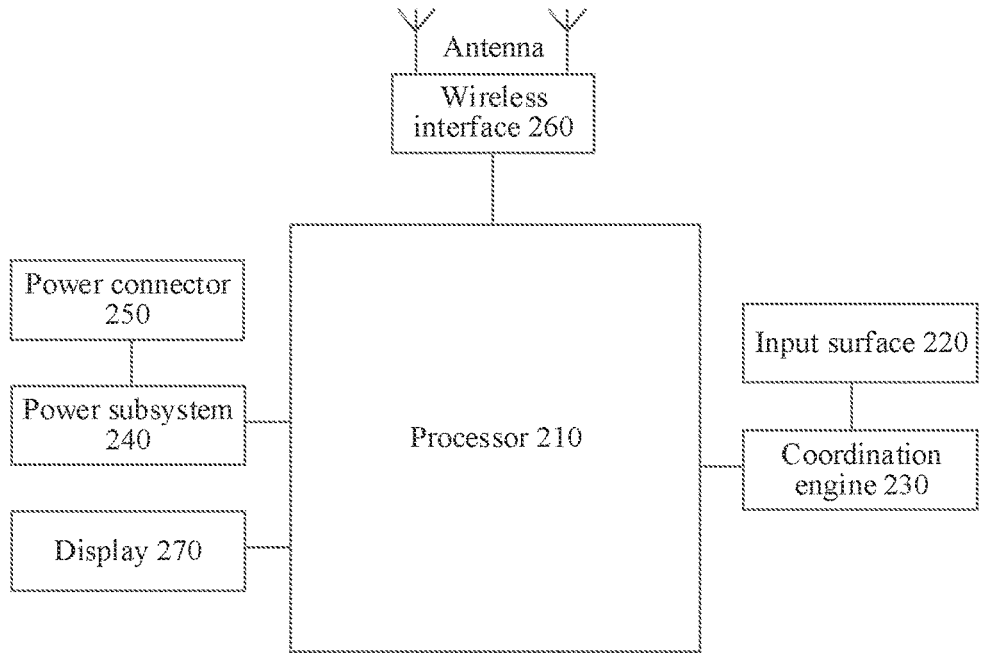
FIG. 7 is a schematic diagram of a hardware structure of an electronic device according to an embodiment of this application.

FIG. 7 is a schematic diagram of a hardware structure of an electronic device according to an embodiment of this application. Referring to FIG. 7, the electronic device 200 may include a plurality of subsystems. The subsystems cooperate to perform, coordinate, or monitor one or more operations or functions of the electronic device 202. The electronic device 200 includes a processor 210, an input surface 220, a coordination engine 230, a power subsystem 240, a power connector 250, a wireless interface 260, and a display 270.

For example, the coordination engine 230 may be configured to communicate with another subsystem of the electronic device 200 and/or process data; communicate with and/or exchange data with the stylus 100; measure and/or obtain outputs of one or more analog or digital sensors (for example, touch panel sensors); measure and/or obtain outputs of one or more sensor nodes in a sensor node array (for example, a capacitive sensing node array); receive and position a tip signal and a ring signal from the stylus 100; and position the stylus 100 based on positions of a tip signal intersection region and a ring signal intersection region.

The coordination engine 230 of the electronic device 200 includes or may be communicatively coupled to, in another manner, a sensor layer located below the input surface 220 or integrated with the input surface. The coordination engine 230 uses the sensor layer to position the stylus 100 on the input surface 220 and uses the technology described in this specification to estimate an angular position of the stylus 100 relative to a plane of the input surface 220. In an embodiment, the input surface 220 may be referred to as a touch screen 201.

For example, the sensor layer of the coordination engine 230 of the electronic device 200 is a grid of capacitive sensing nodes arranged in columns and rows. More specifically, an array of column traces is set to be perpendicular to an array of row traces. The sensor layer may be separated from other layers of the electronic device, or the sensor layer may be directly disposed on another layer. The other layers are, for example but not limited to: a display stack layer, a force sensor layer, a digitizer layer, a polarizer layer, a battery layer, or a structural or decorative housing layer.

The sensor layer can operate in a plurality of modes. If the sensor layer operates in a mutual capacitance mode, the column traces and the row traces form a single capacitive sensing node (for example, a "vertical" mutual capacitance) at each overlapping point. If the sensor layer operates in a self-capacitance mode, the column traces and the row traces form two (vertically aligned) capacitive sensing nodes at each overlapping point. In another implementation, if the sensor layer operates in the mutual capacitance mode, adjacent column traces and/or adjacent row traces may each form a single capacitive sensing node (for example, a "horizontal" mutual capacitance). As described above, the sensor layer may detect existence of the stylus tip 10 of the stylus 100 and/or touch of a finger of the user by monitoring a change in a capacitance (for example, a mutual capacitance or a self-capacitance) presented at each capacitive sensing node. In many cases, the coordination engine 230 may be configured to detect, through capacitive coupling, the tip signal and the ring signal received from the stylus 100 through the sensor layer.

The tip signal and/or the ring signal may include specific information and/or data that may be used for enabling the electronic device 200 to identify the stylus 100. Such information is generally referred to as "stylus identity" information in this specification. The information and/or data may be received by the sensor layer and interpreted, decoded, and/or demodulated by the coordination engine 230.

The processor 210 may use the stylus identity information to simultaneously receive an input from more than one stylus. Specifically, the coordination engine 230 may be configured to transmit, to the processor 210, a position and/or an angular position of each of a plurality of styluses detected by the coordination engine 230. In other cases, the coordination engine 230 may further transmit, to the processor 210, information about relative positions and/or relative angular positions of the plurality of styluses detected by the coordination engine 230. For example, the coordination engine 230 may notify the processor 210 of a position of a detected first stylus relative to a detected second stylus.

In another case, the tip signal and/or the ring signal may further include specific information and/or data used for enabling the electronic device 200 to identify a specific user. Such information is generally referred to as "user identity" information in this specification.

The coordination engine 230 may forward the user identity information (if detected and/or recovered) to the processor 210. If the user identity information cannot be recovered from the tip signal and/or the ring signal, the coordination engine 230 may optionally indicate to the processor 210 that the user identity information is not available. The processor 210 can utilize the user identity information (or a case of absence of the information) in any suitable manner, including but not limited to: accepting or denying an input from a specific user, allowing or denying access to a specific function of the electronic device, or the like. The processor 210 may use the user identity information to simultaneously receive an input from more than one user.

In another case, the tip signal and/or the ring signal may include specific information and/or data that may be used for enabling the electronic device 200 to identify settings or preferences of the user or the stylus 100. Such information is generally referred to as "stylus setting" information in this specification.

The coordination engine 230 may forward the stylus setting information (if detected and/or recovered) to the processor 210. If the stylus setting information cannot be recovered from the tip signal and/or the ring signal, the coordination engine 230 may optionally indicate to the processor 210 that the stylus setting information is not available. The electronic device 200 can utilize the stylus setting information (or a case of absence of the information) in any suitable manner, including but not limited to: applying the settings to the electronic device, applying the settings to a program running on the electronic device, changing a line thickness, a color, or a pattern presented by a graphics program of the electronic device, changing settings of a video game operated on the electronic device, or the like.

In general, the processor 210 may be configured to perform, coordinate, and/or manage functions of the electronic device 200. Such functions may include, but are not limited to: communicating with and/or exchanging data with other subsystems of the electronic device 200, communicating with and/or exchanging data with the stylus 100, performing data communication and/or data exchange through a wireless interface, performing data communication and/or data exchange through a wired interface, facilitating exchange of power through a wireless (for example, inductive or resonant) or wired interface, receiving position(s) and angular position(s) of one or more styluses, or the like.

The processor 210 may be implemented as any electronic device that can process, receive, or send data or instructions. For example, the processor may be a microprocessor, a central processing unit, an application-specific integrated circuit, a field programmable gate array, a digital signal processor, an analog circuit, a digital circuit, or a combination of these devices. The processor may be a single-threaded or multi-threaded processor. The processor may be a single-core or multi-core processor.

During use, the processor 210 may be configured to access a memory that stores instructions. The instructions may be configured to enable the processor to perform, coordinate, or monitor one or more operations or functions of the electronic device 200.

The instructions stored in the memory may be configured to control or coordinate operations of other components of the electronic device 200. The components are, for example but not limited to: another processor, an analog or digital circuit, a volatile or non-volatile memory module, a display, a speaker, a microphone, a rotary input device, a button or other physical input devices, a biometric authentication sensor and/or system, a force or touch input/output component, a communication module (for example, a wireless interface and/or a power connector), and/or a haptic device or a haptic feedback device.

The memory may further store electronic data usable by the stylus or the processor. For example, the memory may store electronic data or content (such as media files, documents, and application programs), device settings and preferences, timing signals and control signals, or data, data structures, or databases for various modules, or files or configurations related to detecting the tip signal and/or the ring signal. The memory may be configured as any type of memory. For example, the memory may be implemented as a random access memory, a read-only memory, a flash memory, a removable memory, other types of storage elements, or a combination of such devices.

The electronic device 200 further includes the power subsystem 240. The power subsystem 240 may include a battery or other power supplies. The power subsystem 240 may be configured to provide power to the electronic device 200. The power subsystem 240 may further be coupled to the power connector 250. The power connector 250 may be any suitable connector or port that may be configured to receive power from an external power supply and/or configured to provide power to an external load. For example, in some implementations, the power connector 250 may be configured to recharge the battery in the power subsystem 240. In another implementation, the power connector 250 may be configured to transmit, to the stylus 100, power stored (or available) in the power subsystem 240.

The electronic device 200 further includes the wireless interface 260 to facilitate electronic communication between the electronic device 200 and the stylus 100. In an implementation, the electronic device 200 may be configured to communicate with the stylus 100 through a low energy Bluetooth communication interface or a near field communication interface. In other examples, the communication interface facilitates electronic communication between the electronic device 200 and an external communication network, a device, or a platform.

The wireless interface 260 (regardless of a communication interface between the electronic device 200 and the stylus 100 or an additional communication interface) may be implemented as one or more wireless interfaces, Bluetooth interfaces, near field communication interfaces, magnetic interfaces, universal serial bus interfaces, inductive interfaces, resonant interfaces, capacitive coupling interfaces, Wi-Fi interfaces, TCP/IP interfaces, network communication interfaces, optical interfaces, acoustic interfaces, or any conventional communication interface.

The electronic device 200 further includes the display 270. The display 270 may be located behind the input surface 220, or may be integrated with the input surface. The display 270 may be communicatively coupled to the processor 210. The processor 210 may present information to the user through the display 270. In many cases, the processor 210 uses the display 270 to present an interface with which the user can interact. In many cases, the user manipulates the stylus 100 to interact with the interface.

It will be apparent to a person skilled in the art that some of the specific details presented above with respect to the electronic device 200 may not be required to practice particular implementations or their equivalents. Similarly, other electronic devices may include a larger quantity of subsystems, modules, components, and the like. Some submodules may be implemented as software or hardware in a proper case. Therefore, it should be understood that the foregoing descriptions are not intended to be exhaustive or to limit the disclosure to the precise form described herein. On the contrary, it is apparent to a person of ordinary skill in the art that many modifications and variations are possible based on the foregoing teachings.

Figure 8:
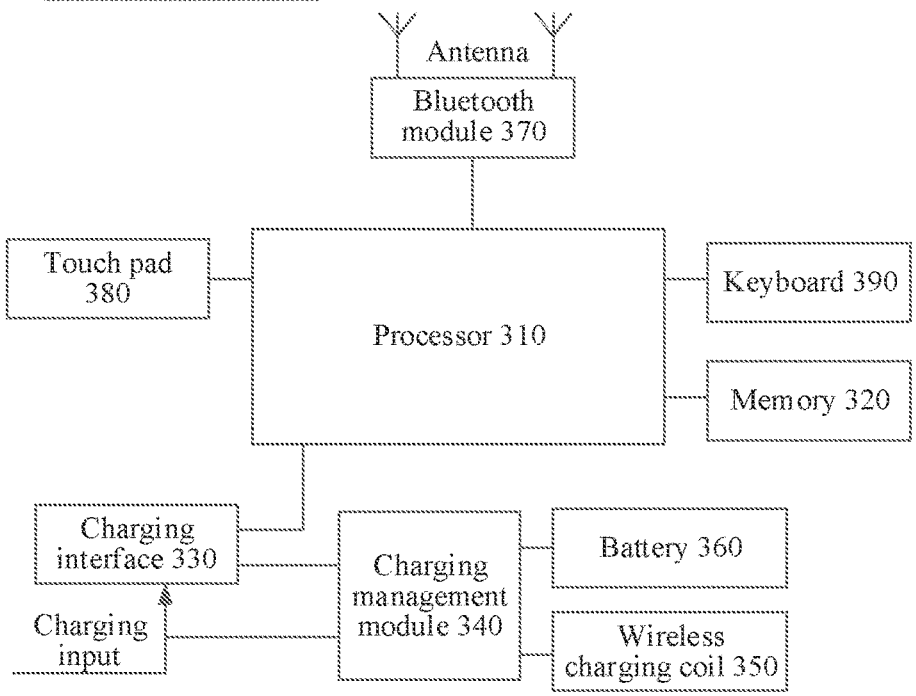
FIG. 8 is a schematic diagram of a hardware structure of a wireless keyboard according to an embodiment of this application.

FIG. 8 is a schematic diagram of a hardware structure of a wireless keyboard according to an embodiment of this application. Referring to FIG. 8, the wireless keyboard 300 may include a processor 310, a memory 320, a charging interface 330, a charging management module 340, a wireless charging coil 350, a battery 360, a wireless communication module 370, a touch pad 380, and a keyboard 390.

The processor 310, the memory 320, the charging interface 330, the charging management module 340, the battery 360, the wireless communication module 370, the touch pad 380, and the keyboard 390 may all be disposed on a keyboard body of the wireless keyboard 300 (that is, the second part 302 shown in FIG. 4). The wireless charging coil 350 may be disposed in the connection portion 304 (shown in FIG. 4) for movably connecting the keyboard body and a support. It may be understood that the structure shown in this embodiment does not constitute a specific limitation on the wireless keyboard 300. In some other embodiments, the wireless keyboard 300 may include more or fewer components than those shown in the figure, or combine some components, or split some components, or have different component arrangements. The components in the figure may be implemented by hardware, software, or a combination of software and hardware.

The memory 320 may be configured to store program code, for example, program code used for wirelessly charging the stylus 100. The memory 320 may further store a Bluetooth address for uniquely identifying the wireless keyboard 300. In addition, the memory 320 may further store connection data of an electronic device that has been successfully paired with the wireless keyboard 300. For example, the connection data may be a Bluetooth address of the electronic device that has been successfully paired with the wireless keyboard 300. Based on the connection data, the wireless keyboard 300 can be automatically paired with the electronic device without having to configure a connection with the electronic device, for example, performing validity verification. The Bluetooth address may be a media access control (MAC) address.

The processor 310 may be configured to execute the application program code, and invoke related modules to implement functions of the wireless keyboard 300 in this embodiment of this application, for example, implement a wired charging function, a reverse wireless charging function, and a wireless communication function of the wireless keyboard 300. The processor 310 may include one or more processing units, and different processing units may be separate devices or may be integrated into one or more processors 310. The processor 310 may be specifically an integrated control chip, or may include a circuit including various active and/or passive components, and the circuit is configured to perform functions of the processor 310 described in this embodiment of this application. The processor of the wireless keyboard 300 may be a microprocessor.

The wireless communication module 370 may be configured to support data exchange between the wireless keyboard 300 and another electronic device including wireless communication such as Bluetooth (BT), a global navigation satellite system (GNSS), a wireless local area network (WLAN) (for example, a wireless fidelity (Wi-Fi) network), frequency modulation (FM), a near field communication (NFC) technology, and an infrared (IR) technology.

In some embodiments, the wireless communication module 370 may be a Bluetooth chip. The wireless keyboard 300 may be a Bluetooth keyboard. The wireless keyboard 300 may be paired with a Bluetooth chip of another electronic device through the Bluetooth chip and establish a wireless connection, to implement wireless communication between the wireless keyboard 300 and the another electronic device through the wireless connection.

In addition, the wireless communication module 370 may further include an antenna. The wireless communication module 370 receives an electromagnetic wave through the antenna, performs frequency modulation and filtering on an electromagnetic wave signal, and sends a processed signal to the processor 310. The wireless communication module 370 may further receive a to-be-sent signal from the processor 310, perform frequency modulation and amplification on the signal, and convert the signal into an electromagnetic wave for radiation through the antenna.

In some embodiments, the wireless keyboard 300 may support wired charging. Specifically, the charging management module 340 may receive a charging input of a wired charger through the charging interface 330.

In some other embodiments, the wireless keyboard 300 may support forward wireless charging. The charging management module 340 may receive a wireless charging input through the wireless charging coil 350 of the wireless keyboard 300. Specifically, the charging management module 340 is connected to the wireless charging coil 350 through a matching circuit. The wireless charging coil 350 may be coupled to a wireless charging coil of a wireless charger to induce an alternating electromagnetic field emitted by the wireless charging coil 350 of the wireless charger and generate an alternating electrical signal. The alternating electrical signal generated by the wireless charging coil 350 is transmitted to the charging management module 340 through the matching circuit, to wirelessly charge the battery 360.

The charging management module 340 may further provide power to the wireless keyboard 300 while charging the battery 360. The charging management module 340 receives an input of the battery 360, and supplies power to the processor 310, the memory 320, an external memory, the wireless communication module 370, and the like. The charging management module 340 may be further configured to monitor parameters such as a battery capacity, a battery cycle count, and a battery state of health (such as electric leakage or impedance) of the battery 360. In some other embodiments, the charging management module 340 may alternatively be disposed in the processor 310.

In some other embodiments, the wireless keyboard 300 may support reverse wireless charging. Specifically, the charging management module 340 may further receive an input of the charging interface 330 or the battery 360, and convert a direct electrical signal that is input by the charging interface 330 or the battery 360 into an alternating electrical signal. The alternating electrical signal is transmitted to the wireless charging coil 350 through the matching circuit. The wireless charging coil 350 may generate an alternating electromagnetic field upon receiving the alternating electrical signal. A wireless charging coil of another mobile terminal may perform wireless charging upon inducing the alternating electromagnetic field. That is, the wireless keyboard 300 may further wirelessly charge the another mobile terminal. In an embodiment, the wireless charging coil 350 may be disposed in the accommodating portion 303 of the wireless keyboard 300, and a wireless charging coil is disposed in the stylus rod 20 of the stylus 100. When the stylus 100 is placed in the accommodating portion 303, the wireless keyboard 300 may charge the stylus 100 through the wireless charging coil 350.

It should be noted that, the matching circuit may be integrated in the charging management module 340, or the matching circuit may be independent of the charging management module 340. This is not limited in this embodiment of this application. FIG. 8 is a schematic diagram of a hardware structure of the wireless keyboard 300 by using an example in which the matching circuit may be integrated in the charging management module 340.

The charging interface 330 may be configured to provide a wired connection for charging or communication between the wireless keyboard 300 and another electronic device (for example, the wired charger of the wireless keyboard 300).

A touch panel sensor is integrated in the touch pad 380. A notebook computer may receive a control command of a user on the notebook computer through the touch pad 380 and the keyboard 390.

It may be understood that the structure shown in this embodiment of this application does not constitute a specific limitation on the wireless keyboard 300. The wireless keyboard may have more or fewer components than those shown in FIG. 8, may combine two or more components, or may have a different component deployment. For example, a housing of the wireless keyboard 300 may also be provided with an accommodating cavity for accommodating the stylus 100. The wireless charging coil 350 is disposed in the accommodating cavity, and is configured to wirelessly charge the stylus 100 when the stylus 100 is accommodated in the accommodating cavity.

For another example, an outer surface of the wireless keyboard 300 may further include components such as a key, an indicator light (which may indicate a state such as a battery level, an incoming/outgoing call, or a pairing mode), and a display screen (which may prompt a user with related information). The key may be a physical key or a touch key (which is used in collaboration with the touch panel sensor), and is configured to trigger an operation such as power-on, power-off, starting charging, or stopping charging.

It should be understood that, the method provided in this embodiment of this application is also applicable to a scenario in which the stylus 100 and the electronic device 200 are included.

Figure 9:
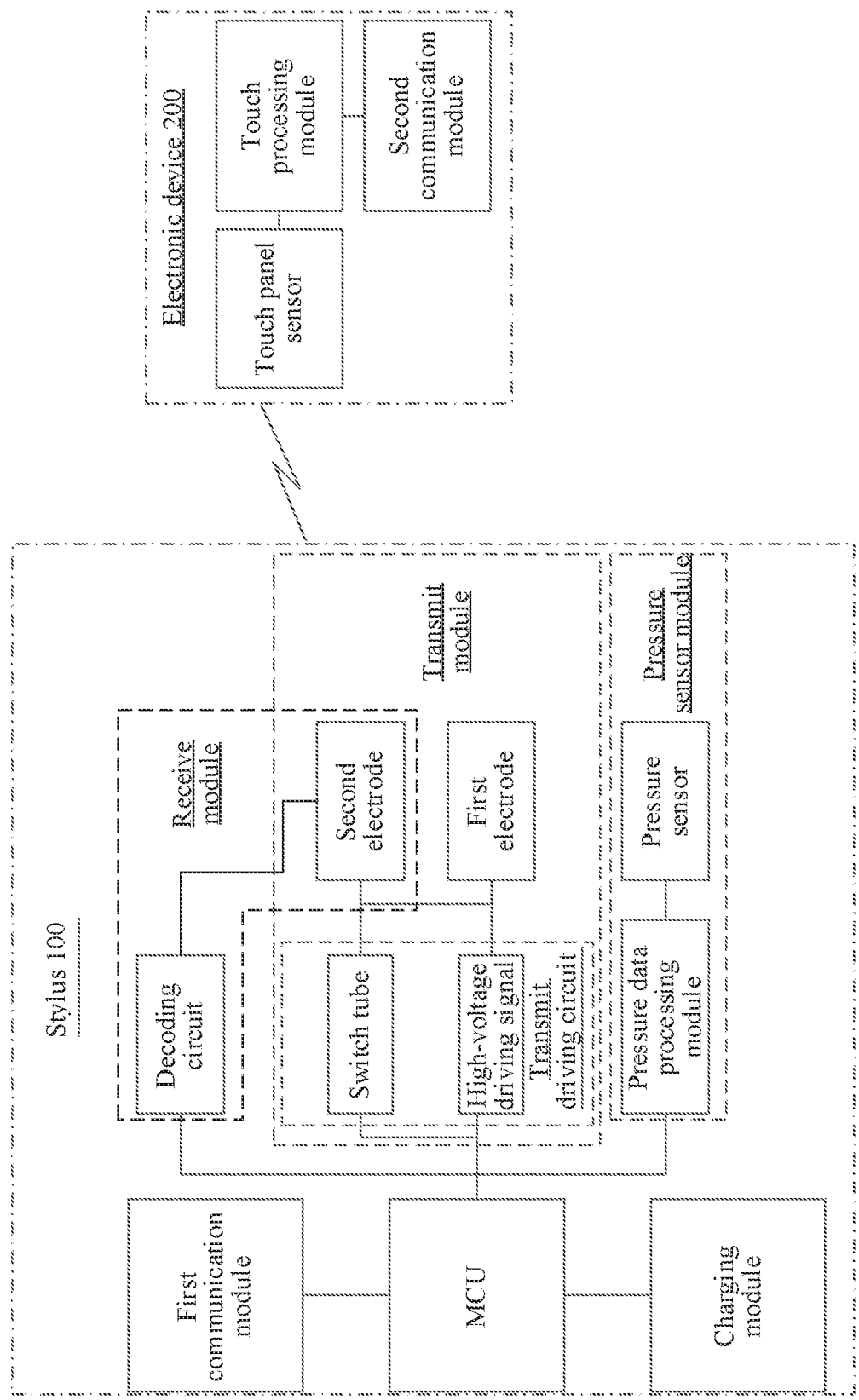
FIG. 9 is a schematic diagram of interaction between a stylus and an electronic device according to an embodiment of this application.

FIG. 9 is a schematic diagram of interaction between a stylus and an electronic device to which an embodiment of this application is applicable. Referring to FIG. 9, the stylus 100 includes a microcontroller unit (MCU), a first communication module, a charging module, a pressure sensor module, a transmit (TX) module, and a receive (RX) module. The electronic device 200 includes a touch panel sensor (TP sensor), a touch processing module, and a second communication module. It should be understood that, the following embodiment is described by using an example in which both the first communication module and the second communication module are Bluetooth modules, and the first communication module and the second communication module may alternatively be wireless local area network modules or Wi-Fi modules. This is not limited in this embodiment of this application. It should be understood that, the stylus and the electronic device may establish a wireless path through the first communication module and the second communication module, to exchange wireless signals.

In the electronic device, the touch processing module is connected to the touch panel sensor and the second communication module respectively. The touch panel sensor may include an electrode array. The touch panel sensor is configured to collect touch data, and the touch data may include data of the stylus being in contact with a touch screen. The touch processing module is configured to determine a position of a stylus tip of the stylus and an angle between the stylus and the touch screen (hereinafter referred to as an angle) based on the touch data collected by the touch panel sensor. For details, refer to related descriptions of FIG. 11A and FIG. 11B. After the electronic device wirelessly establishes the wireless path with the stylus, that is, after the electronic device is wirelessly connected to the stylus, the touch processing module may send an uplink signal to the stylus through the electrode array, where the uplink signal indicates the stylus to feed back a downlink signal. The touch processing module may determine the position of the stylus tip of the stylus and the angle based on the downlink signal from the stylus. In an embodiment, both the uplink signal and the downlink signal may be square wave signals. In an embodiment, the touch processing module may be a touch integrated circuit (IC) chip.

In the stylus, the MCU is connected to the first communication module, the charging module, the pressure sensor module, the transmit module, and the receive module respectively. It should be understood that, the MCU may be understood as the processor shown in FIG. 6. The charging module is configured to charge the stylus. The pressure sensor module includes a pressure sensor and a pressure data processing module. The pressure sensor is connected to the pressure data processing module, and the pressure data processing module is connected to the MCU. The pressure sensor may be disposed in the stylus tip of the stylus, and the pressure sensor is configured to collect pressure of the stylus tip. For example, when the stylus tip of the stylus is in contact with the touch screen of the electronic device, the pressure sensor may collect the pressure of the stylus tip. The data processing module is configured to send the pressure of the stylus tip to the MCU. In an embodiment, the MCU may send the pressure of the stylus tip to the electronic device based on the first communication module. The electronic device may receive the pressure of the stylus tip in the stylus based on the second communication module, to adjust a line thickness of the stylus during writing on the touch screen.

The transmit module may include a first electrode, a second electrode, and a transmit driving circuit. Both the first electrode and the second electrode are connected to the transmit driving circuit, and the transmit driving circuit is connected to the MCU. The MCU is configured to generate a first pulse width modulation (PWM) signal and a second PWM signal, and send the first PWM signal and the second PWM signal to the transmit driving circuit. The transmit driving circuit may drive the first electrode to send a first signal based on the first PWM signal, and drive the second electrode to send a second signal based on the second PWM signal. The first electrode may be referred to as TX1, and the second electrode may be referred to as TX2. In an embodiment, the first signal and the second signal may be referred to as downlink signals or code marking signals. In an embodiment, the downlink signal may be a 40 V square wave signal. It should be understood that, the uplink signal and the downlink signal in this embodiment of this application are said based on the stylus. It may be learned that, based on the electronic device, the electronic device may send a downlink signal to the stylus, and the stylus may send an uplink signal to the electronic device based on the downlink signal. The following embodiment is described by using an example in which the stylus sends a downlink signal, and the electronic device sends an uplink signal.

Referring to FIG. 9, in an embodiment, the transmit driving circuit may include a high-voltage driving signal module and a switch tube. The MCU is connected to the high-voltage driving signal module and the switch tube respectively. The switch tube is connected to the second electrode, and the high-voltage driving signal module is connected to the first electrode and the second electrode respectively. The high-voltage driving signal module is configured to provide a high-voltage driving signal, drive the first electrode to send the first signal based on the first PWM signal from the MCU, and drive the second electrode to send the second signal based on the second PWM signal from the MCU.

In an embodiment, the MCU is further configured to control the switch tube, to implement switching of the second electrode between signal sending and signal receiving, that is, implement switching of the second electrode between the TX2 and the RX. A specific circuit of the switch tube and a control manner of the MCU are not described in this embodiment of this application. In other words, the MCU may control the switch tube, to cause the second electrode to serve as the TX2, and the second electrode serving as the TX2 is connected to the transmit driving circuit, so that the second electrode sends the second signal under the action of the transmit driving circuit. The MCU may also control the switch tube, to cause the second electrode to serve as the RX, and the second electrode serving as the RX is connected to the receive module, so that the second electrode may receive the uplink signal from the electronic device. That is, the second electrode may switch between the TX2 and the RX under control of the MCU.

The receive module includes a decoding circuit. The decoding circuit may be connected to the switch tube, and the decoding circuit is further connected to the MCU. The second electrode is configured to receive the uplink signal from the electronic device and send the uplink signal to the decoding circuit. The decoding circuit is configured to decode the uplink signal and send a decoded uplink signal to the MCU.

It should be understood that, the structure of the stylus shown in FIG. 9 is an example. In an embodiment, one transmit electrode TX and one receive electrode RX may be disposed in the stylus. This is not limited in this embodiment of this application.

Figure 10:
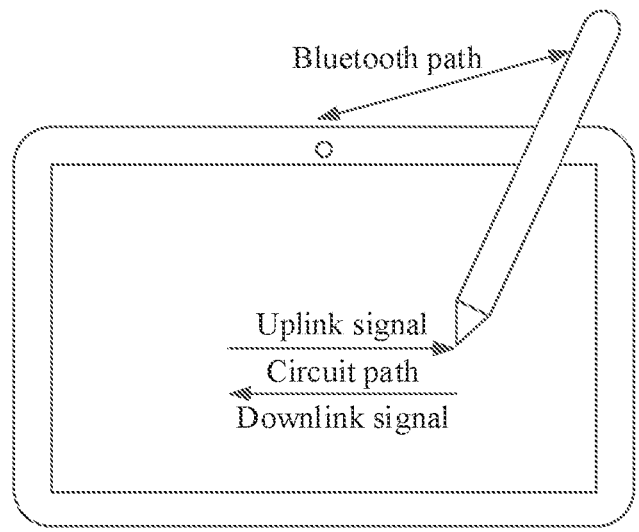
FIG. 10 is a schematic diagram of another scenario to which an embodiment of this application is applicable.

Based on the structure shown in FIG. 9, the following describes a process of interaction between the electronic device and the stylus with reference to FIG. 10. Referring to FIG. 10, for example, the stylus and the electronic device may establish a wireless path. For example, a Bluetooth path may be established between the stylus and the electronic device. The stylus tip of the stylus is provided with an electrode, and the touch panel sensor in the electronic device includes an electrode array. There is an insulating substance (for example, air or glass on the touch screen) between the stylus tip of the stylus and the electrode of the touch panel sensor. Therefore, a capacitance is formed between the stylus tip of the stylus and the electrode of the touch panel sensor, the stylus tip of the stylus and the touch panel sensor in the electronic device may establish an electrical connection through the capacitance, and a path between the stylus tip of the stylus and the touch panel sensor of the electronic device is referred to as an electrical path in the following embodiment.

In an embodiment, when a Bluetooth connection between the electronic device and the stylus succeeds, the touch processing module may control the touch panel sensor to send an uplink signal through the electrical path. In an embodiment, when a Bluetooth connection between the electronic device and the stylus succeeds and the electronic device detects that the stylus is not charged, the touch processing module may control the touch panel sensor to send an uplink signal through the electrical path. In an embodiment, when a Bluetooth connection between the electronic device and the stylus succeeds and the electronic device detects the stylus is in a moving state, the touch processing module may control the touch panel sensor to send an uplink signal through the electrical path. It should be understood that, trigger conditions for different electronic devices to send an uplink signal may be different, and the following embodiment is described by using an example in which "when a Bluetooth connection between the electronic device and the stylus succeeds, the touch processing module controls the touch panel sensor to send an uplink signal through the electrical path".

The second electrode may receive the uplink signal from the electronic device and send the uplink signal to the decoding circuit based on the electrical path. The decoding circuit may transmit the decoded uplink signal to the MCU. Based on the decoded uplink signal, the MCU controls the transmit driving circuit to drive the first electrode to send the first signal and drive the second electrode to send the second signal. That is, the stylus may send a downlink signal through the electrical path. The touch panel sensor in the electronic device may receive the downlink signal based on the electrical path. The touch processing module may obtain the position of the stylus tip of the stylus and the angle based on the downlink signal collected by the touch panel sensor.

Figure 11A:
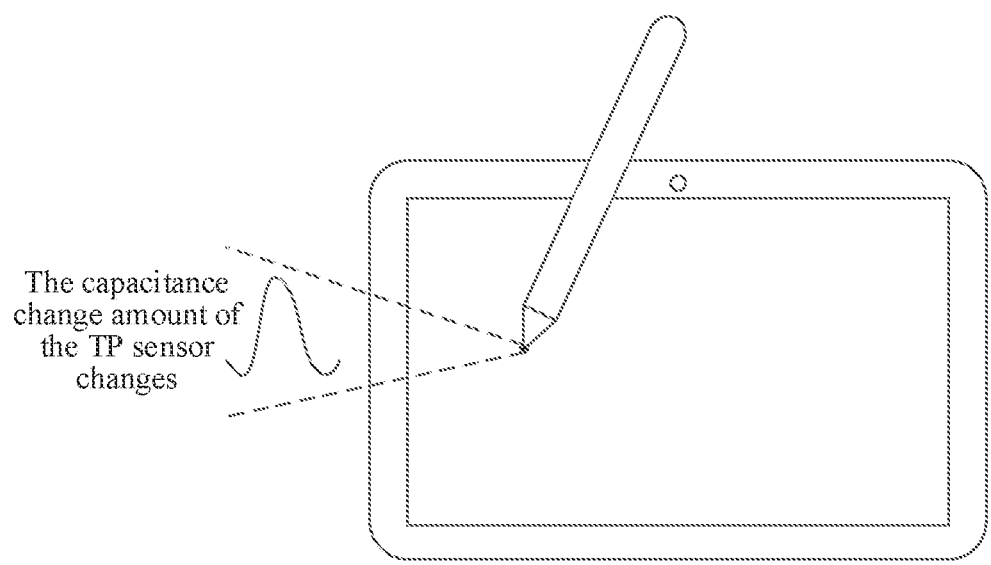
FIG. 11A is a schematic diagram of capacitance changes of a touch screen.
Figure 11B:
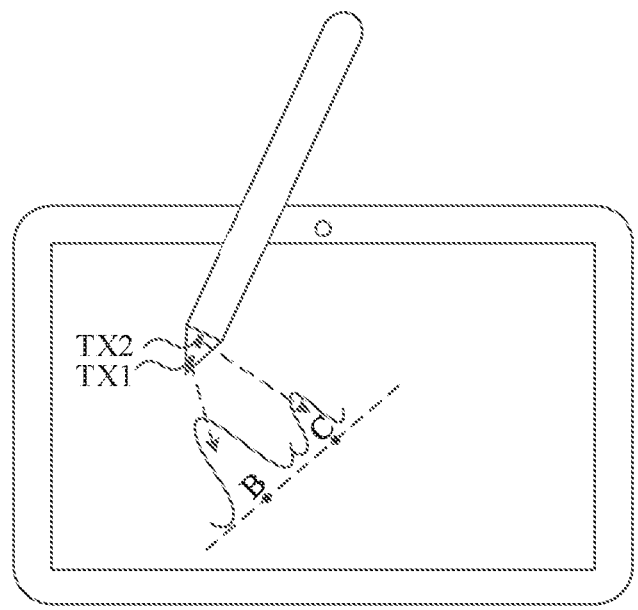
FIG. 11B is another schematic diagram of capacitance changes of a touch screen.

FIG. 11A is a schematic diagram of capacitance changes of a touch screen. When the touch panel sensor receives the first signal from the first electrode of the stylus, a capacitance change amount at a corresponding position of the touch screen changes. In addition, a smaller distance between the stylus tip of the stylus and the touch screen indicates a greater capacitance change amount at the corresponding position of the touch screen. Referring to FIG. 11A, a peak in FIG. 11A represents that the capacitance change amount at the corresponding position of the touch screen changes, and the electronic device may determine the position of the stylus tip of the stylus based on the capacitance change amount on the touch screen. In addition, the electronic device may obtain the angle through a double-stylus tip projection method in an inclination angle detection algorithm. Referring to FIG. 11B, in an embodiment, the first electrode and the second electrode in the stylus may be disposed in the stylus tip of the stylus, where the first electrode is disposed close to a tip of the stylus tip, and the second electrode is disposed away from the tip of the stylus tip relative to the first electrode. When the touch panel sensor receives the first signal from the first electrode and the second signal from the second electrode of the stylus, capacitance change amounts at two positions (for example, a position B and a position C) of the touch screen change, and the electronic device may obtain the angle based on a distance between the first electrode and the second electrode and a distance between the two positions of the touch screen. For a more detailed double-stylus tip projection method, refer to related descriptions in the conventional technology. A position at which the stylus is in contact with the touch screen is represented by using a black dot in FIG. 11A, and the position B and the position C are represented by using black dots in FIG. 11B.

Figure 12:
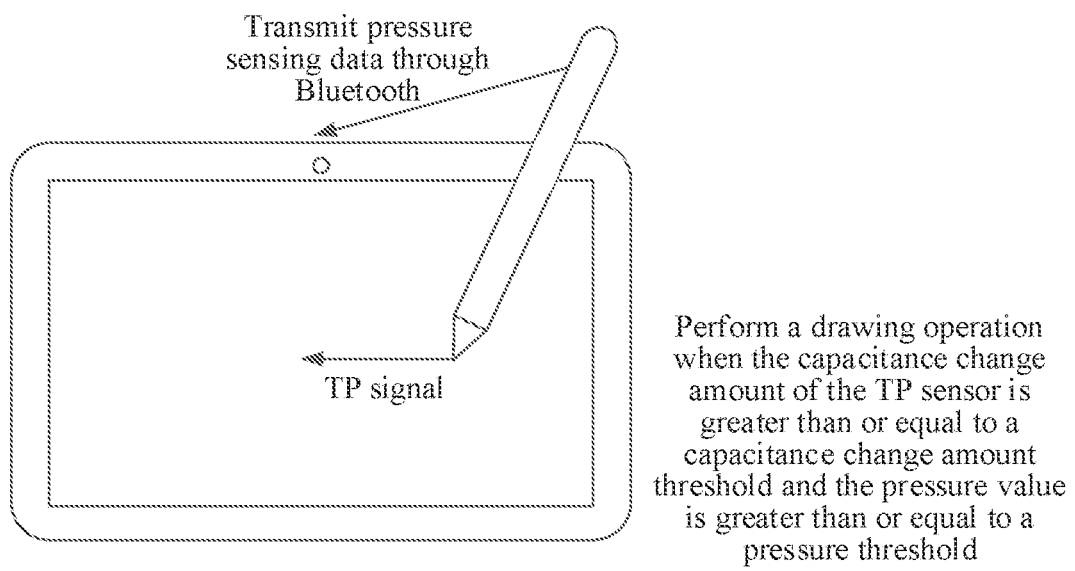
FIG. 12 is a schematic diagram of an existing electronic device drawing a handwriting of a stylus.

FIG. 12 is a schematic diagram of an existing electronic device drawing a handwriting of a stylus. Referring to related descriptions of FIG. 2B, a pressure sensor may be disposed in the stylus tip of the stylus. Referring to FIG. 12, when the stylus tip of the stylus is in contact with the touch screen of the electronic device, the pressure sensor may collect pressure sensing data of the stylus tip and send the pressure sensing data to the electronic device through Bluetooth. The pressure sensing data may include a pressure value. In addition, based on related descriptions in FIG. 10, when the Bluetooth connection between the electronic device and the stylus succeeds, the stylus may send a downlink signal to the electronic device, and the electronic device may obtain the position of the stylus on the touch screen and the angle between the stylus and the touch screen based on the downlink signal. In an embodiment, the downlink signal may be referred to as a touch panel (TP) signal, and the following is described by using the TP signal as an example.

In the conventional technology, the electronic device may display a handwriting of the stylus on the touch screen based on a pressure sensing signal of the stylus and the TP signal of the stylus. Specifically, the capacitance change amount of the TP sensor in the electronic device may change due to the TP signal, and the electronic device may obtain a pressure value based on the pressure sensing signal, if the electronic device detects that the capacitance change amount of the TP sensor is greater than or equal to a capacitance change amount threshold and the pressure value is greater than or equal to a pressure threshold, the electronic device may display the handwriting at a corresponding position of the touch screen based on the position of the stylus on the touch screen.

If one condition of "the pressure sensing signal" and "the TP signal" is not met (for example, the capacitance change amount of the TP sensor is less than the capacitance change amount threshold or the pressure value is less than the pressure threshold), the stylus cannot write, that is, the electronic device does not display the handwriting of the stylus on the touch screen. Currently, the manner that the electronic device displays the handwriting of the stylus based on "the pressure sensing signal" and "the TP signal" has a low response speed and low control precision. Specific reasons are as follows:

The pressure sensing signal is transmitted through Bluetooth, and Bluetooth transmission has a transmission delay ranging from 10 ms to 20 ms. If the stylus just leaves the touch screen, due to the transmission delay, the stylus still sends the pressure sensing signal to the electronic device, and the capacitance change amount of the TP sensor is still greater than the capacitance change amount threshold. In this case, the electronic device continues to display the handwriting of the stylus, leading to ink leakage and poor user experience. It should be understood that, the ink leakage refers to that the stylus still writes after leaving the touch screen, that is, the electronic device still displays the handwriting of the stylus.

In addition, the pressure sensor in the stylus tip of the stylus may be a spring tube pressure sensor or a strain gauge pressure sensor, and due to an inherent defect of the pressure sensor that a small pressure value cannot be detected, the pressure threshold is generally set to a value greater than 0 such as 5 g, where g represents 9.8 N/kg. In this way, when the user uses the stylus to write obliquely or slightly touch the touch screen, the pressure value is less than the pressure threshold, so that the stylus does not write, and the electronic device does not display the handwriting of the stylus. In addition, a physical structure of the pressure sensor is easily affected by a temperature shift or deformation, leading to an inaccurate measured pressure value.

As a result, the electronic device has a low response speed and low control precision during handwriting drawing.

When the electronic device receives the TP signal from the stylus, the capacitance change amount of the TP sensor changes, and a smaller distance between the stylus and the touch screen indicates a greater capacitance change amount of the TP sensor. In this way, the capacitance change amount of the TP sensor can represent the distance between the stylus and the touch screen, and if the capacitance change amount of the TP sensor is used as a determining factor for the electronic device to draw the handwriting of the stylus, the problem of low precision caused by the inherent defect of the pressure sensor may be avoided, and the problem of a low response speed caused by the pressure sensing signal transmitted through Bluetooth may also be avoided.

However, if the electronic device uses only the condition that "the capacitance change amount of the TP sensor is greater than or equal to the capacitance change amount threshold" to determine whether to draw the handwriting of the stylus, a ping-pong effect may be caused, leading to broken contact when the user uses the stylus. The broken contact may be understood as that: if the capacitance change amount of the TP sensor is greater than or equal to the capacitance change amount threshold, the stylus writes, and the electronic device displays the handwriting of the stylus; and if the capacitance change amount of the TP sensor is less than the capacitance change amount threshold, the stylus does not write, and the electronic device does not display the handwriting of the stylus. In this way, at the capacitance change amount threshold, the stylus switches between writing and not writing, and the electronic device also switches between displaying the handwriting and not displaying the handwriting, leading to a ping-pong effect.

Based on this, an embodiment of this application provides a handwriting drawing method. Based on the capacitance change amount of the TP sensor, the electronic device may set a first capacitance change amount threshold for the electronic device to display the handwriting (that is, the stylus writes) when the stylus writes (that is, moves close to the touch screen) and set a second capacitance change amount threshold for the electronic device not to display the handwriting (that is, the stylus does not write) when the stylus is lifted (that is, moves away from the touch screen), where the first capacitance change amount threshold is different from the second capacitance change amount threshold. In this way, in this embodiment of this application, while the response speed and control precision of the electronic device during handwriting drawing are improved, a ping-pong effect of the electronic device during handwriting displaying and the problem of broken contact when the user uses the stylus are also avoided. It should be understood that, the first capacitance change amount threshold is represented by a first threshold and the second capacitance change amount threshold is represented by a second threshold in the following embodiment.

The handwriting drawing method provided in this embodiment of this application is described below with reference to specific embodiments. The following embodiments may be mutually combined, and same or similar concepts or processes may not be repeatedly described in some embodiments.

Figure 13:
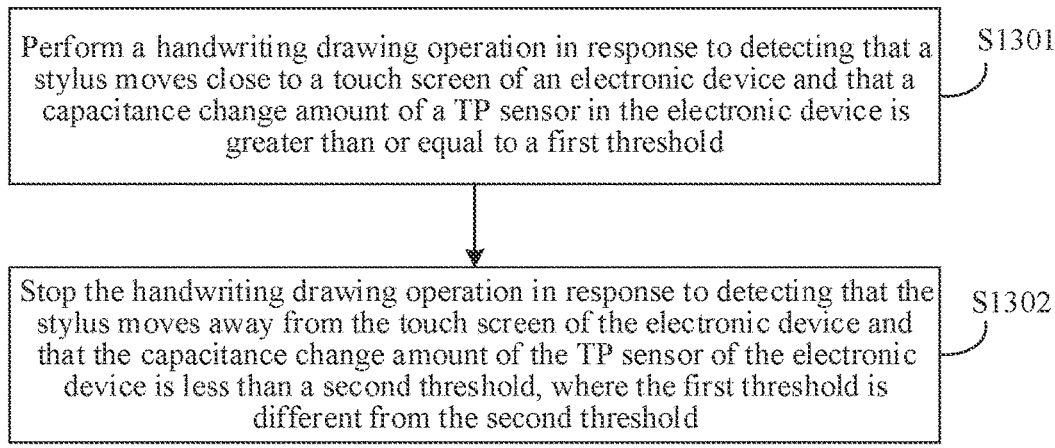
FIG. 13 is a schematic flowchart of an embodiment of a handwriting drawing method according to an embodiment of this application.

FIG. 13 is a schematic flowchart of an embodiment of a handwriting drawing method according to an embodiment of this application. Referring to FIG. 13, the handwriting drawing method provided in this embodiment of this application may include the following steps.

S1301. Perform a handwriting drawing operation in response to detecting that a stylus moves close to a touch screen of an electronic device and that a capacitance change amount of a TP sensor in the electronic device is greater than or equal to a first threshold.

That a stylus moves close to a touch screen of an electronic device may be understood as that: The stylus moves toward a direction close to the touch screen of the electronic device.

In an embodiment, the electronic device may detect whether the stylus moves close to the touch screen of the electronic device based on the capacitance change amount of the TP sensor in the electronic device. A smaller distance between the stylus and the touch screen indicates a greater capacitance change amount, so that if the electronic device detects that the capacitance change amount of the TP sensor gradually increases, the electronic device determines that the stylus moves close to the touch screen of the electronic device.

When the user uses the stylus, the stylus sometimes moves toward the direction close to the touch screen of the electronic device and sometimes moves toward a direction away from the touch screen of the electronic device, to ensure accuracy of the electronic device in determining whether the stylus moves close to the touch screen of the electronic device, in an embodiment, if the electronic device detects that the capacitance change amount of the TP sensor increases within a preset duration, the electronic device determines that the stylus moves close to the touch screen of the electronic device. In this way, according to this embodiment, a problem that the electronic device determines that the stylus moves close to the touch screen of the electronic device and further changes control logic when the stylus temporarily moves toward the direction close to the touch screen of the electronic device may be avoided, thereby improving control precision of the electronic device.

In an embodiment, a sensor configured to detect a distance may be disposed in the touch screen of the electronic device, and the sensor is configured to obtain distance data between the stylus and the touch screen. Based on this, the electronic device may determine the distance between the stylus and the touch screen based on the distance data collected by the sensor, and further detect whether the stylus moves close to the touch screen based on the distance between the stylus and the touch screen. If the distance between the stylus and the touch screen gradually decreases, the electronic device determines that the stylus moves close to the touch screen of the electronic device.

For example, the sensor may include but not limited to: an infrared distance sensor, an ultrasonic distance sensor, or a depth sensor. It should be understood that, when the sensor is an infrared distance sensor, the distance data collected by the infrared sensor may include a moment at which an infrared ray is received after being reflected by the stylus, and the electronic device may further calculate the distance between the stylus and the touch screen based on a moment at which the infrared ray is emitted and the moment at which the infrared ray is received after being reflected by the stylus. For principles that the ultrasonic distance sensor and the depth sensor detects a distance, refer to related descriptions in the conventional technology.

The electronic device stores the first threshold, and the first threshold may be understood as a writing threshold when the stylus writes or a threshold triggering the electronic device to draw a handwriting of the stylus when the stylus writes. If the electronic device detects that the stylus moves close to the touch screen of the electronic device and that the capacitance change amount of the TP sensor in the electronic device is greater than or equal to the first threshold, the electronic device performs the handwriting drawing operation. That the electronic device performs the handwriting drawing operation may be understood as that: The electronic device displays, based on a position of the stylus on the touch screen, the handwriting at the position. The handwriting drawing may include but not limited to text drawing and painting.

In an embodiment, the first threshold may be an experience value or a predefined value. For example, in a development phase of the electronic device, a developer may select a plurality of electronic devices, hold the stylus to gradually move close to the touch screen of each electronic device, and obtain a capacitance change amount of the TP sensor of each touch screen that is spaced from the stylus by any distance. The developer may set, based on a drawing habit of the user holding the stylus in combination with the capacitance change amount of the TP sensor obtained in the development phase, a first threshold that adapts to the drawing habit of the user.

Figure 14:
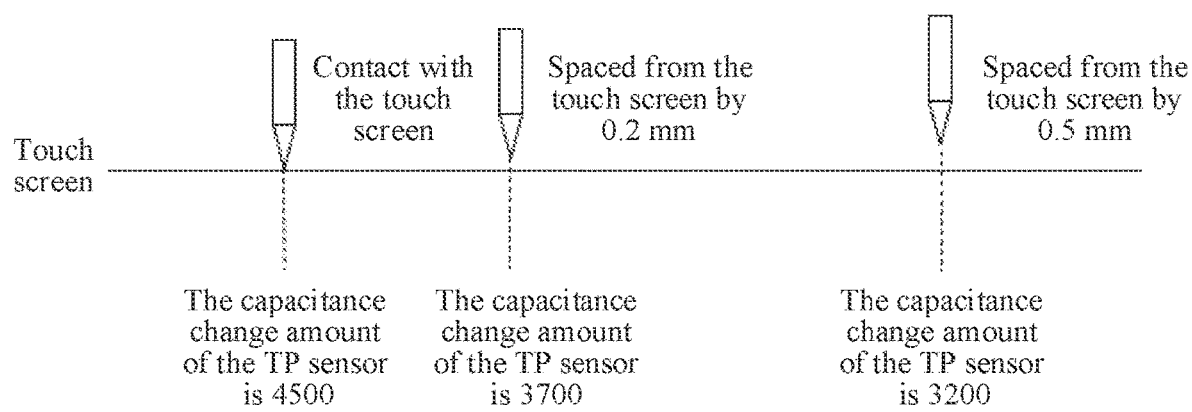
FIG. 14 is a schematic diagram of a capacitance change amount of a TP sensor according to an embodiment of this application.
Figure 15:
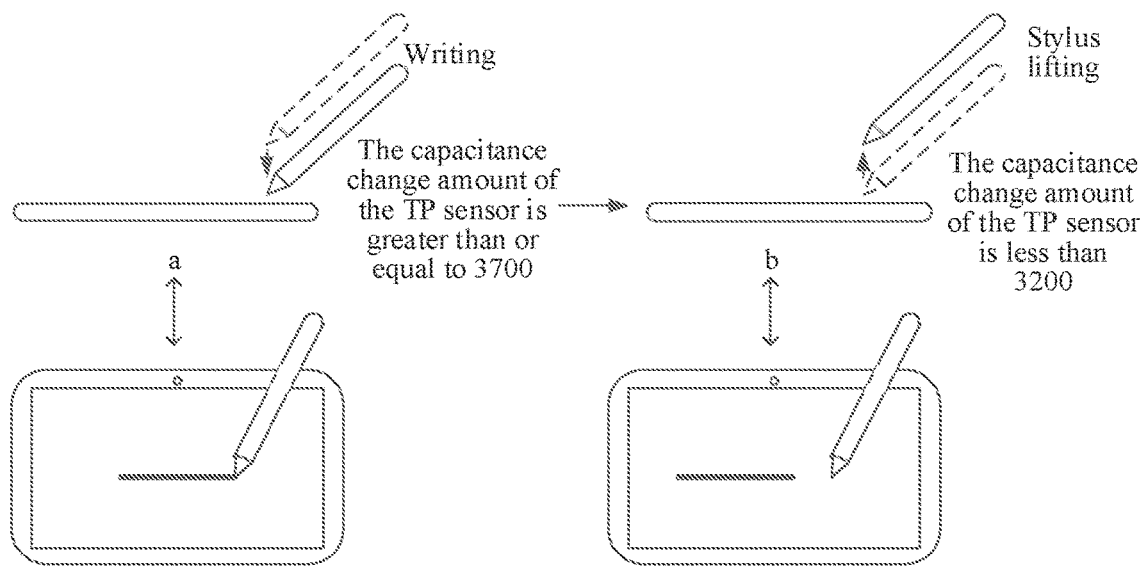
FIG. 15 is a schematic diagram of handwriting drawing according to an embodiment of this application.

For example, referring to FIG. 14, when the stylus is in contact with the touch screen, the capacitance change amount of the TP sensor is 4500 (touch sig); when the distance between the stylus and the touch screen is 0.2 mm, the capacitance change amount of the TP sensor is 3700 (0.2 mm sig); and when the distance between the stylus and the touch screen is 0.5 mm, the capacitance change amount of the TP sensor is 3200 (0.5 mm sig). In an embodiment, the first threshold may be 3700. In this way, referring to a in FIG. 15, when the electronic device detects that the stylus moves close to the touch screen of the electronic device and that the capacitance change amount of the TP sensor in the electronic device is greater than or equal to 3700, the electronic device may perform the handwriting drawing operation.

In an embodiment, S1301 may be replaced with: Perform a handwriting drawing operation in response to detecting that a capacitance change amount of a TP sensor in an electronic device is greater than or equal to a first threshold. In this embodiment, the electronic device may not need to determine a movement direction of the stylus relative to the touch screen (for example, moving close to the touch screen), and the electronic device may perform the handwriting drawing operation in response to detecting that the capacitance change amount of the TP sensor is greater than or equal to the first threshold.

S1302. Stop the handwriting drawing operation in response to detecting that the stylus moves away from the touch screen of the electronic device and that the capacitance change amount of the TP sensor of the electronic device is less than a second threshold, where the first threshold is different from the second threshold.

That the stylus moves away from the touch screen of the electronic device may be understood as that: The stylus moves toward a direction away from the touch screen of the electronic device. Similar to S1301, the electronic device may detect whether the stylus moves away from the touch screen of the electronic device based on the capacitance change amount of the TP sensor. For example, in an embodiment, if the electronic device detects that the capacitance change amount of the TP sensor gradually decreases, the electronic device determines that the stylus moves away from the touch screen of the electronic device. Alternatively, in an embodiment, if the electronic device detects that the capacitance change amount of the TP sensor gradually decreases within a preset duration, the electronic device determines that the stylus moves away from the touch screen of the electronic device.

The electronic device stores the second threshold, and the second threshold may be understood as a non-writing threshold when the stylus is lifted or a threshold triggering the electronic device to stop drawing the handwriting when the stylus is lifted. If the electronic device detects that the stylus moves away from the touch screen of the electronic device and that the capacitance change amount of the TP sensor in the electronic device is less than the second threshold, the electronic device stops the handwriting drawing operation.

To avoid a ping-pong effect of the electronic device, the second threshold is different from the first threshold. For example, referring to the description in FIG. 14, the second threshold may be 3200. In this way, referring to b in FIG. 15, when the electronic device detects that the stylus moves away from the touch screen of the electronic device and that the capacitance change amount of the TP sensor in the electronic device is less than 3200, the electronic device may stop the handwriting drawing operation.

In an embodiment, the first threshold may be greater than the second threshold, for example, the first threshold 3700 is greater than the second threshold 3200. Such a setting may adapt to the drawing habit of the user, and specific reasons are as follows:

For example, in a process that the stylus moves close to the touch screen, when the distance between the stylus and the touch screen is 0.2 mm, the electronic device performs the handwriting drawing operation, and ink leakage of the stylus may be avoided. When the user operates the stylus to perform drawing, stylus lifting cannot be avoided when the user draws strokes of text, but the user still needs to write. Therefore, if the second threshold is set to be excessively large, the electronic device stops handwriting drawing once the user lifts the stylus. In this way, in this embodiment of this application, the second threshold 3200 is set to be less than the first threshold 3700, that is, when the user lifts the stylus and is spaced from the touch screen by a specific distance, the electronic device stops handwriting drawing. In this way, when the user really needs to stop writing, the electronic device may stop the handwriting drawing operation adaptively, which adapts to the drawing habit of the user and improves user experience. It should be understood that, in this embodiment of this application, the second threshold is not set to be excessively small, to avoid ink leakage of the stylus.

In an embodiment, S1302 may be replaced with: Stop the handwriting drawing operation in response to detecting that the capacitance change amount of the TP sensor in the electronic device is less than the first threshold. In this embodiment, the electronic device may not need to determine the movement direction of the stylus relative to the touch screen (for example, moving away from the touch screen), and the electronic device may stop the handwriting drawing operation in response to detecting that the capacitance change amount of the TP sensor is less than the second threshold.

In this embodiment of this application, the electronic device performs the handwriting drawing operation in response to detecting that the stylus moves close to the touch screen of the electronic device and that the capacitance change amount of the TP sensor in the electronic device is greater than or equal to the first threshold, and stops the handwriting drawing operation in response to detecting that the stylus moves away from the touch screen of the electronic device and that the capacitance change amount of the TP sensor in the electronic device is less than the second threshold, where the first threshold is different from the second threshold. In this embodiment of this application, the electronic device determines whether to perform the handwriting drawing operation based on the capacitance change amount of the TP sensor rather than based on a pressure sensing signal of a stylus tip of the stylus. Therefore, a Bluetooth transmission delay may be avoided, and a response speed of the electronic device during handwriting drawing is improved. In addition, a problem of low control precision of the electronic device caused by an inherent defect of a pressure sensor of the stylus tip of the stylus may be also avoided. In this embodiment of this application, the electronic device determines whether to perform the handwriting drawing operation based on the capacitance change amount of the TP sensor, so that a handwriting can be also drawn by the stylus without pressure. That is, an objective that the electronic device draws a handwriting when the user holds the stylus and slightly touches the touch screen or writes obliquely is achieved. In addition, in this embodiment of this application, a first threshold for the electronic device to draw a handwriting is set when the stylus moves close to the touch screen, and a second threshold for the electronic device to stop drawing a handwriting is set when the stylus moves away from the touch screen, thereby avoiding a ping-pong effect of the electronic device during handwriting drawing.

Figure 16A:
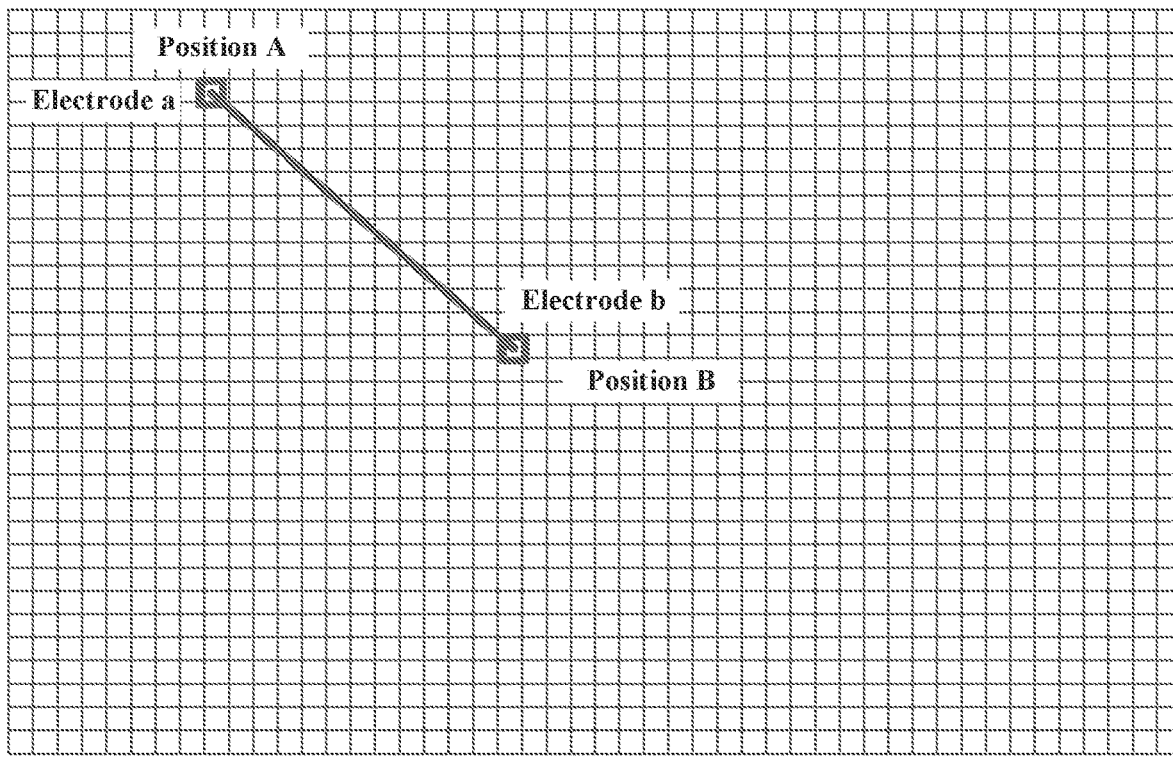
FIG. 16A is a schematic diagram of a TP sensor according to an embodiment of this application.

The TP sensor of the electronic device may be regarded as an electrode array, and referring to FIG. 16A, an example in which the electrode array includes 32 (TX)×48 (RX) electrodes is used. In an embodiment, 32 (TX)×48 (RX) may be regarded as a channel quantity of the TP sensor. Due to manufacturing of the electrode, impedance at each position of the TP sensor is inconsistent, further leading to inconsistent TP signals of the TP sensor. The inconsistent TP signals may be understood as that: When the stylus is in contact with different positions of the touch screen, the capacitance change amount of the TP sensor differs.

For example, when the stylus is in contact with a position A of the touch screen, the capacitance change amount of the TP sensor is 4500, and when the stylus is in contact with a position B of the touch screen, the capacitance change amount of the TP sensor is 4300. According to the embodiment shown in FIG. 13, that the electronic device determines whether to perform the handwriting drawing operation based on the capacitance change amount of the TP sensor depends on consistency of the TP signals of the TP sensor.

Figure 17:
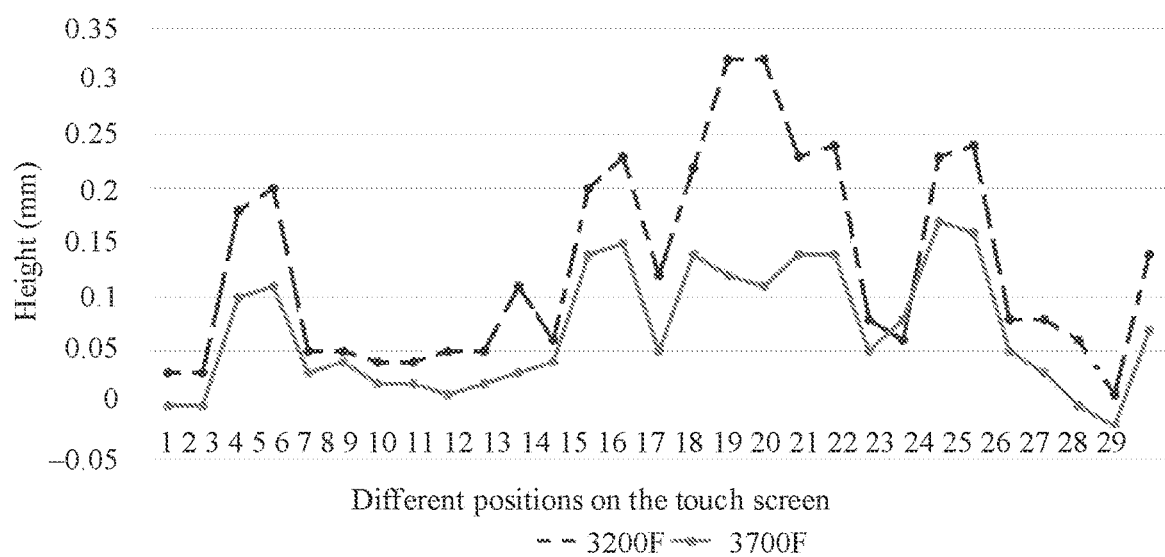
FIG. 17 is a schematic diagram of a writing height and a stylus lifting height of a stylus at each position on a touch screen according to an embodiment of this application.

If the consistency of the TP signals of the TP sensor is poor, when the first threshold (3700) and the second threshold (3200) are reached at different positions of the touch screen, distances between the stylus and the touch screen are different, leading to remarkably different writing heights and stylus lifting heights of the stylus at different positions of the touch screen and poor user experience. For example, referring to FIG. 17, at a position 1 of the touch screen, a writing height and a stylus lifting height of the stylus are respectively 0 mm and 0.03 mm, and at a position 18 of the touch screen, the writing height and the stylus lifting height of the stylus are respectively 0.11 mm and 0.33 mm.

For example, in the foregoing embodiment, when the stylus is in contact with the touch screen, the capacitance change amount of the TP sensor is 4500 (touch sig); when the distance between the stylus and the touch screen is 0.2 mm, the capacitance change amount of the TP sensor is 3700 (0.2 mm sig); and when the distance between the stylus and the touch screen is 0.5 mm, the capacitance change amount of the TP sensor is 3200 (0.5 mm sig). The capacitance change amount of the TP sensor is a real measured value at a position in the TP sensor, and based on this, the electronic device may obtain a first ratio and a second ratio. The first ratio is a ratio of the first threshold to "the capacitance change amount of the TP sensor when the stylus is in contact with the touch screen", and the second ratio is a ratio of the second threshold to "the capacitance change amount of the TP sensor when the stylus is in contact with the touch screen". The first ratio is used for representing a ratio of the capacitance change amount of the TP sensor when the stylus writes to "the capacitance change amount of the TP sensor when the stylus is in contact with the touch screen" or a ratio of the capacitance change amount of the TP sensor when the electronic device starts to perform the handwriting drawing operation to "the capacitance change amount of the TP sensor when the stylus is in contact with the touch screen". The second ratio is used for representing a ratio of the capacitance change amount of the TP sensor when the stylus is lifted to "the capacitance change amount of the TP sensor when the stylus is in contact with the touch screen" or a ratio of the capacitance change amount of the TP sensor when the electronic device stops the handwriting drawing operation to "the capacitance change amount of the TP sensor when the stylus is in contact with the touch screen".

For example, the first ratio ENTER_NOPRESS_RATIO may be obtained based of the following Formula 1, and the second ratio EXIT_NOPRESS_RATIO may be obtained based on the following Formula 2:

$$ENTER\_NOPRESS\_RATIO = 3700/4500 \approx 822 \qquad \text{Formula 1}$$

$$EXIT\_NOPRESS\_RATIO = 3200/4500 \approx 711 \qquad \text{Formula 2}$$

To resolve the problem of inconsistency of a writing height and a stylus lifting height of the stylus at each position of the TP sensor caused by inconsistent TP signals in the electronic device, in this embodiment of this application, the electronic device may learn a first threshold and a second threshold at each position in the TP sensor by itself based on historical data of the user, to further adapt to the drawing habit of the user and improve user experience. The historical data may be understood as: a capacitance change amount of the TP sensor when the stylus is in contact with each position of the touch screen when the user historically uses the stylus to perform drawing. Specifically, the electronic device may learn the first threshold and the second threshold at each position in the TP sensor by itself based on the capacitance change amount of the TP sensor when the stylus is in contact with each position of the touch screen when the user historically uses the stylus to perform drawing and the first ratio and the second ratio. It should be understood that, in an embodiment, the touch screen may include a first position and a second position, and in this embodiment of this application, "the first threshold and the second threshold at each position" may be represented by "a first threshold and a second threshold at the first position" and "a first threshold and a second threshold at the second position".

The following describes in detail a process that the electronic device learns the first threshold and the second threshold at each position in the TP sensor by itself. It should be understood that, a size of the TP sensor and a size of the touch screen may be the same, and each position in the TP sensor corresponds to each position on the touch screen, so that each position in the TP sensor may be understood as each position on the touch screen, and each region in the TP sensor may be understood as each region in the touch screen.

Referring to FIG. 16A, the electronic device may divide the TP sensor into N regions based on the channel quantity of the TP sensor and learn a first threshold and a second threshold in each region in the N regions by itself. Further, the electronic device may determine whether to perform the handwriting drawing operation based on the position of the stylus on the touch screen and a first threshold and a second threshold of a region in which the position falls. N is an integer greater than or equal to 2, and an area of each region in the N regions may be the same or different.

In an embodiment, N is equal to a quantity of the electrodes in the TP sensor, for example, N is 32×48. For example, referring to FIG. 16A, the user historically operates the stylus to draw a line from a position A to a position B on the touch screen, where the position A falls in a region of an electrode a in the TP sensor, and the position B falls in a region of an electrode b in the TP sensor. The following is described by using an example in which the electronic device learns first thresholds and second thresholds at the position A and the position B by itself.

When the stylus is in contact with the position A on the touch screen, the stylus may send a pressure sensing signal to the electronic device through Bluetooth. In this way, when receiving the pressure sensing signal, the electronic device may determine that the stylus is in contact with the touch screen, and may further use a capacitance change amount of the TP sensor when receiving the pressure sensing signal as a capacitance change amount of the TP sensor at the position A. The electronic device may obtain the first threshold and the second threshold at the position A based on the capacitance change amount of the TP sensor when the stylus is in contact with the position A on the touch screen and the first ratio and the second ratio. For example, when the capacitance change amount of the TP sensor when the stylus is in contact with the position A on the touch screen is X, the first threshold may be 0.822X, and the second threshold may be 0.711X.

In the process that the stylus draws the line from the position A to the position B on the touch screen, the stylus does not leave the touch screen all the time, so that the stylus may continuously send a pressure sensing signal to the electronic device based on a pressure value collected by a pressure sensor. When the electronic device receives the pressure sensing signal and detects that the stylus is located at the position B on the touch screen based on a TP signal from the stylus, the electronic device may use a capacitance change amount of the TP sensor when receiving the pressure sensing signal as a capacitance change amount of the TP sensor at the position B. The electronic device may obtain the first threshold and the second threshold at the position B based on the capacitance change amount of the TP sensor when the stylus is in contact with the position B on the touch screen and the first ratio and the second ratio. For details, refer to related descriptions of the position A.

In this way, the electronic device may obtain a first threshold and a second threshold at each position on the line from the position A to the position B. In this embodiment of this application, the electronic device may store the first threshold and the second threshold at each position on the line from the position A to the position B. In other words, the electronic device may store a first mapping relationship, and the first mapping relationship is used for representing the first threshold and the second threshold at each position on the touch screen.

In this embodiment, when the stylus is in contact with the position A on the touch screen, if an angle between the stylus and the touch screen differs, the capacitance change amount of the TP sensor also differs. That is, the angle between the stylus and the touch screen affects the capacitance change amount of the TP sensor. In this embodiment of this application, to avoid a problem of inaccurate first threshold and second threshold at the position A caused by different angles between the stylus and the touch screen, the electronic device may continuously learn and update the first threshold and the second threshold at the position A based on the capacitance change amount when the stylus is in contact with the position A. For example, the electronic device may continuously learn and update the first threshold and the second threshold at the position A by itself based on the capacitance change amount of the TP sensor at the position A in a plurality of pieces of historical data, to improve accuracy of the first threshold and the second threshold at the position A.

For example, referring to FIG. 16A, the user historically operates the stylus to draw a line from the position A to a position C on the touch screen. The electronic device may continue to update the first mapping relationship stored in the electronic device based on a capacitance change amount of the TP sensor at each position when the user historically operates the stylus to be in contact with the touch screen.

The position A is used as an example. The electronic device may obtain a new capacitance change amount of the TP sensor when the stylus is in contact with the position A on the touch screen in the process of drawing the line from the position A to the position C based on the stylus, and obtain a new first threshold and a new second threshold at the position A based on the new capacitance change amount of the TP sensor and the first ratio and the second ratio. For details, refer to related descriptions of the position A. The electronic device may update the first threshold and the second threshold at the position A based on the first threshold and the second threshold at the position A that have been stored in the electronic device and the new first threshold and the new second threshold at the position A.

In an embodiment, the electronic device may use an average value of the stored first threshold and the new first threshold at the position A as an updated first threshold at the position A, and use an average value of the stored second threshold and the new second threshold at the position A as an updated second threshold at the position A.

In an embodiment, the electronic device may use a weighted average method to update the first threshold and the second threshold at the position A based on the first threshold and the second threshold at the position A that have been stored in the electronic device and the new first threshold and the new second threshold at the position A. A manner that the electronic device updates the first threshold and the second threshold at the position A is not limited in this embodiment of this application.

In an embodiment, the electronic device may use the new first threshold and the new second threshold at the position A to replace the first threshold and the second threshold at the position A that have been stored in the electronic device.

In an embodiment, N is less than (32×48), and an example in which N is (32×48)/M is used, where M is an integer less than N, (32×48)/M is an integer greater than 1, and M may be customized. For example, referring to FIG. 16B, an example in which (32×48)/M is 4 is used for description. The electronic device may divide the TP sensor into four regions with an equal area: an upper left region, an upper right region, a lower left region, and a lower right region.

For example, the user historically operates the stylus to draw a line from a position A to a position B on the touch screen, where the line falls in the upper left region. In this embodiment of this application, referring to the foregoing related descriptions, after obtaining a first threshold and a second threshold at each position on the line from the position A to the position B, the electronic device may use an average method or a weight average method, to obtain a first threshold and a second threshold in the upper left region. An example in which the weight average method is used. The electronic device may use an average value of the first threshold at each position on the line from the position A to the position B as the first threshold in the upper left region, and use an average value of the second threshold at each position on the line from the position A to the position B as the second threshold in the upper left region.

In this embodiment, in a process that the user actually uses the stylus to draw a handwriting, if the electronic device detects that a position of the stylus falls in a target region (for example, the upper left region), the electronic device may determine whether to perform a handwriting drawing operation based on the first threshold and the second threshold in the upper left region.

Figure 16B:
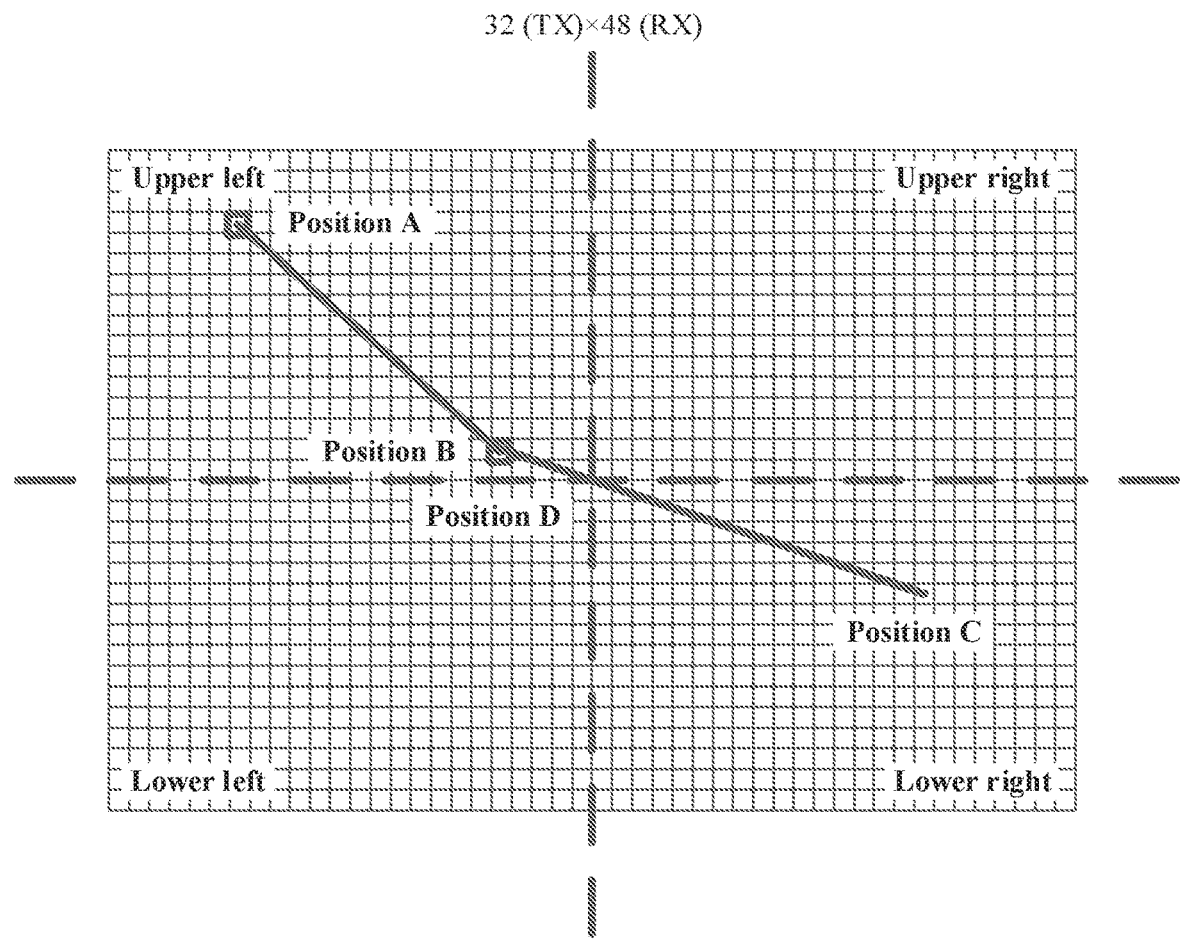
FIG. 16B is another schematic diagram of a TP sensor according to an embodiment of this application.

In this embodiment, referring to FIG. 16B, the user historically operates the stylus to draw a line from the position A to a position C on the touch screen, where the position A to a position D fall in the upper left region, and the position D to the position C fall in the lower right region. The electronic device may update the first threshold and the second threshold in the upper left region based on the position A to the position D, and update a first threshold and a second threshold in the lower right region based on the position D to the position C. For a detailed update method, refer to related descriptions in FIG. 16A.

In this way, the electronic device may obtain a first region and a second region in each region of the touch screen. In other words, the electronic device may store a second mapping relationship, and the second mapping relationship is used for representing the first threshold and the second threshold in each region of the touch screen. It should be understood that, in an embodiment, the touch screen includes a first region and a second region, and in this embodiment of this application, "the first threshold and the second threshold in each region" may be represented by "a first threshold and a second threshold in the first region" and "a first threshold and a second threshold in the second region".

In an embodiment, as shown in FIG. 16A, a region in which each electrode is located may be regarded as one region, and the first mapping relationship may also represent the first threshold and the second threshold in each region.

Figure 18:
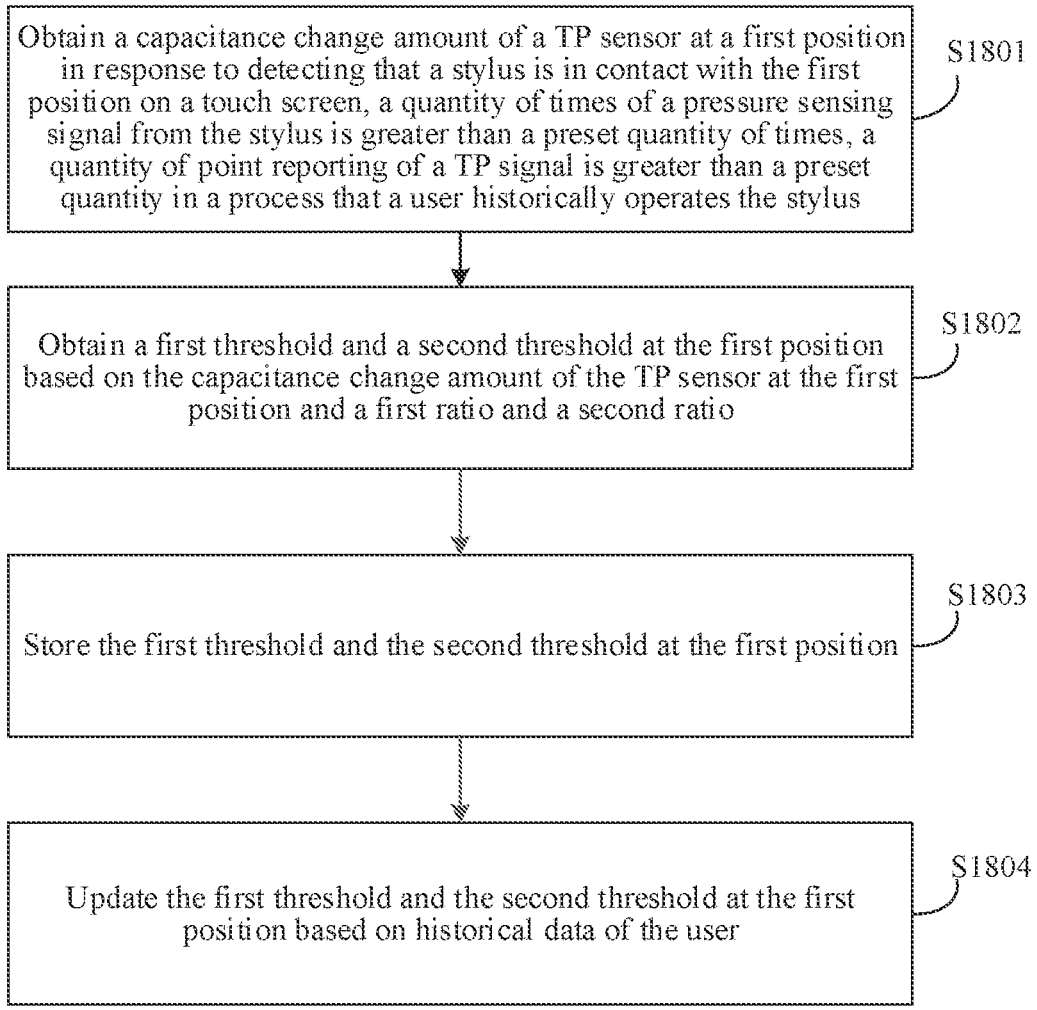
FIG. 18 is a schematic flowchart of obtaining a first threshold and a second threshold at each position on a touch screen according to an embodiment of this application.

In an embodiment, when obtaining a capacitance change amount of the TP sensor when the user historically operates the stylus to use the stylus to be in contact with a position on the touch screen, the electronic device may preprocess the obtained capacitance change amount of the TP sensor, to improve accuracy of the capacitance change amount of the TP sensor, thereby improving accuracy of the first threshold and the second threshold. It should be understood that, if the stylus stays at a position on the touch screen for a long enough time, the electronic device may accurately obtain a capacitance change amount of the TP sensor when the stylus is in contact with the position, and if the stylus quickly moves across a position on the touch screen, accuracy of the electronic device in obtaining a capacitance change amount of the TP sensor at the position is relatively low. Based on this, referring to FIG. 18, in this embodiment of this application, the electronic device may obtain the first threshold and the second threshold at each position on the TP sensor in the following manner:

S1801. Obtain a capacitance change amount of a TP sensor at a first position in response to detecting that a stylus is in contact with the first position on a touch screen, a quantity of times of a pressure sensing signal from the stylus is greater than a preset quantity of times, a quantity of point reporting of a TP signal is greater than a preset quantity in a process that a user historically operates the stylus.

The first position is used for representing any position on the touch screen. For processes that the electronic device detects that the stylus is in contact with the first position on the touch screen and obtains the capacitance change amount of the TP sensor, refer to related descriptions of the foregoing embodiments.

A difference between S1801 and the foregoing obtaining a capacitance change amount of the TP sensor at a position on the touch screen lies in that: In the foregoing embodiment, once the electronic device detects that the stylus is in contact with the first position based on the TP signal, the electronic device obtains the capacitance change amount of the TP sensor at the first position, which has relatively low accuracy. In S1801, the electronic device may detect that the stylus stays at the first position for a period of time, and then obtain the capacitance change amount of the TP sensor at the first position, which has high accuracy. In this embodiment of this application, a manner that the electronic device determines that the stylus stays at the first position for a period of time is: the quantity of times of the pressure sensing signal is greater than the preset quantity of times, and the quantity of point reporting of the TP signal is greater than the preset quantity.

It should be understood that, when the stylus is in contact with the touch screen, the stylus continuously sends a pressure sensing signal to the electronic device, and that the quantity of times of the pressure sensing signal is greater than the preset quantity of times may represent that: The stylus stays at the first position for a time of "two pressure sensing signals". The quantity of point reporting of the TP signal is related to a signal sending frequency supported by the stylus. For example, the stylus supports a signal sending frequency of 240 Hz or 360 Hz, and the 240 Hz is used as an example, the stylus may send point reporting to the electronic device once (or may be understood as reporting a point to the electronic device once) at intervals of 1000/240=4.17 ms. That the quantity of point reporting of the TP signal is greater than the preset quantity may represent that: The stylus stays at the first position for a time of "the preset quantity of point reporting".

S1802. Obtain a first threshold and a second threshold at the first position based on the capacitance change amount of the TP sensor at the first position and a first ratio and a second ratio.

S1803. Store the first threshold and the second threshold at the first position.

S1804. Update the first threshold and the second threshold at the first position based on historical data of the user.

For S1802 to S1804, refer to the foregoing related descriptions.

When the user uses the stylus to perform drawing, an angle between the stylus and the touch screen is neither excessively large nor excessively small. For example, the user may not place the stylus to be perpendicular to the touch screen to perform drawing, or place the stylus to be parallel to the touch screen to perform drawing, and the angles between the stylus and the touch screen are drawing angles that are not commonly used by the user. In an embodiment, during self-learning, the electronic device may further pre-process the obtained capacitance change amount of the TP sensor based on the angle between the stylus and the touch screen, to further improve accuracy of the first threshold and the second threshold.

In this embodiment, S1801 may be replaced with S1801A: Obtain the capacitance change amount of the TP sensor at the first position in response to detecting that the stylus is in contact with the first position on the touch screen, a quantity of times of the pressure sensing signal from the stylus is greater than a preset quantity of times, a quantity of point reporting of the TP signal is greater than a preset quantity, and an angle between the stylus and the touch screen is within a preset angle range in a process that a user historically operates the stylus.

The preset angle range is an angle range adapting to a drawing habit of the user. A difference between S1801A and S1801 lies in that: The condition "an angle between the stylus and the touch screen is within a preset angle range" is further added when the electronic device obtains the capacitance change amount of the TP sensor at the first position, and during self-learning of the electronic device, a capacitance change amount of the TP sensor under an extreme angle (for example, falling outside the preset angle range) may be deleted. In this way, accuracy of the first threshold and the second threshold learned by the electronic device by itself is higher, and this more adapts to the drawing habit of the user.

Figure 19:
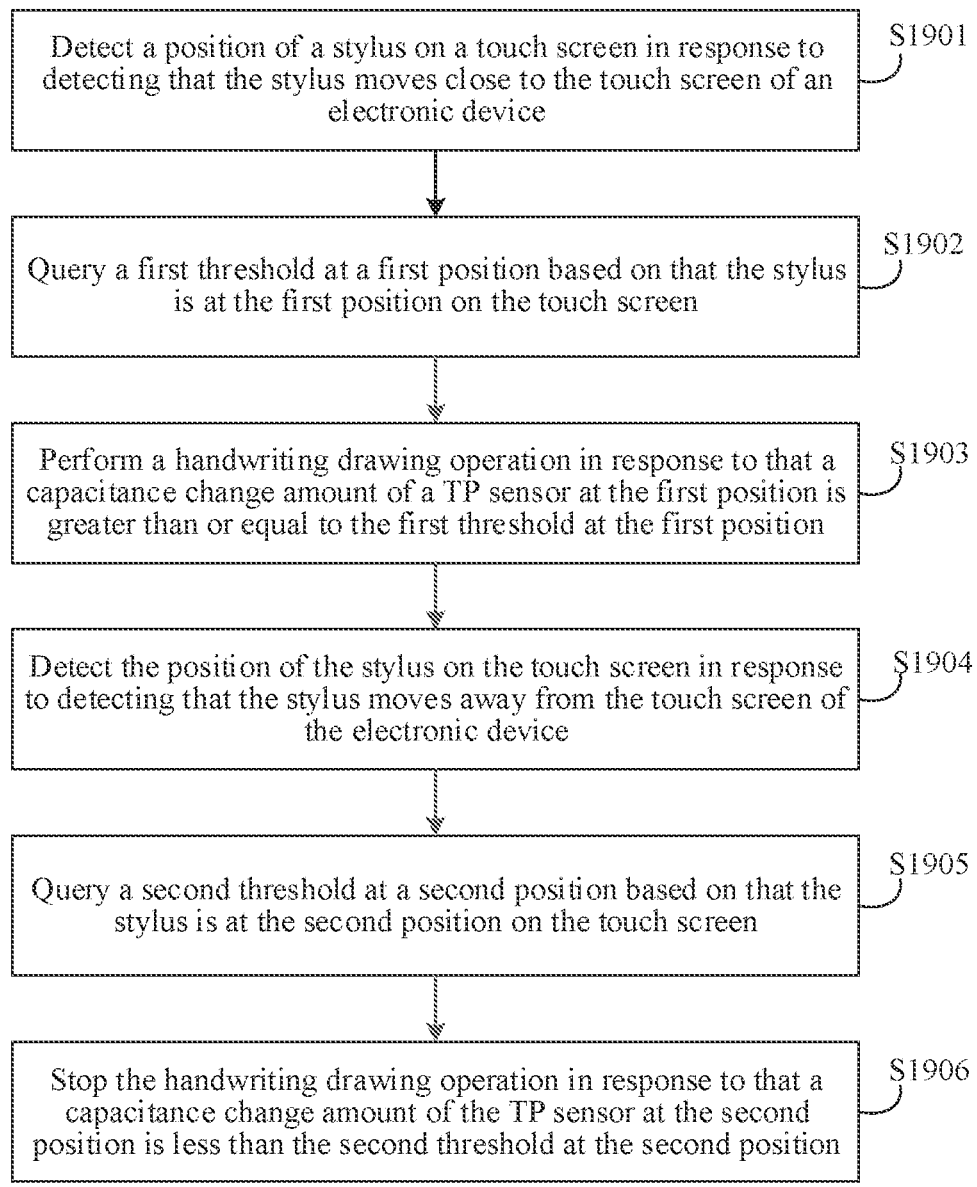
FIG. 19 is a schematic flowchart of another embodiment of a handwriting drawing method according to an embodiment of this application.

Based on the technical solution that the electronic device may learn the first threshold and the second threshold at each position on the touch screen by itself, FIG. 19 is a schematic flowchart of another embodiment of a handwriting drawing method according to an embodiment of this application.

Referring to FIG. 19, the handwriting drawing method provided in this embodiment of this application may include the following steps.

S1901. Detect a position of a stylus on a touch screen in response to detecting that the stylus moves close to the touch screen of an electronic device.

For a manner that the electronic device detects that the stylus moves close to the touch screen of the electronic device in S1901, refer to related descriptions in S1301, and for a manner that the electronic device detects the position of the stylus on the touch screen, refer to related descriptions in the foregoing embodiments. It should be understood that, the position of the stylus on the touch screen may be understood as a position of the stylus on the touch screen when the stylus is not in contact with the touch screen.

S1902. Query a first threshold at a first position based on that the stylus is at the first position on the touch screen.

The electronic device may store a first threshold and a second threshold at each position (or in each region) on the touch screen, so that the electronic device may query and obtain the first threshold at the first position in the first threshold and the second threshold at each position (or in each region) that have been stored.

In an embodiment, the electronic device may query the first threshold at the first position in the first mapping relationship. In an embodiment, the electronic device may obtain a target region (a first region) to which the first position belongs, and further use a first threshold and a second threshold in the target region as the first threshold and a second threshold at the first position respectively in the second mapping relationship.

In an embodiment, if the electronic device does not learn (store) the first threshold and the second threshold at the first position during self-learning, the electronic device may use a preset first threshold and a preset second threshold as the first threshold and the second threshold at the first position respectively. It should be understood that, the preset first threshold and the preset second threshold may be the experience values in the embodiment shown in FIG. 13. For example, the preset first threshold may be 3700, and the preset second threshold may be 3200.

In an embodiment, if the electronic device does not learn (store) the first threshold and the second threshold at the first position during self-learning, the electronic device may use a first threshold at a "stored position" that is closest to the first position as the first threshold at the first position For example, the position of the stylus on the touch screen is a position X, and the electronic device does not store a first threshold at the position X but stores a first threshold at a position Y and a first threshold at a position Z. therefore, the electronic device may obtain a first distance between the position X and the position Y and a second distance between the position X and the position X. If the first distance is smaller than the second distance, the electronic device may use the first threshold at the position Y as the first threshold at the position X.

S1903. Perform a handwriting drawing operation in response to that a capacitance change amount of a TP sensor at the first position is greater than or equal to the first threshold at the first position.

The first threshold at each position of the electronic device differs, so that when the electronic device detects that the capacitance change amount of the TP sensor at the first position is greater than or equal to the first threshold at the first position, the electronic device performs the handwriting drawing operation. For details, refer to related descriptions in the foregoing embodiments.

S1904. Detect the position of the stylus on the touch screen in response to detecting that the stylus moves away from the touch screen of the electronic device.

For a process that the electronic device detects that the stylus moves away from the touch screen of the electronic device and that the stylus is at the second position on the touch screen, refer to the foregoing related descriptions. The electronic device may store a second threshold at each position (or in each region) on the touch screen, so that the electronic device may query a second threshold at the second position in the second threshold at each position (or in each region) that has been stored. For a query manner, refer to related descriptions of querying the first threshold at the first position.

In an embodiment, when the stylus moves away from the touch screen, the second position of the stylus on the touch screen may be the same as or different from the first position of the stylus on the touch screen when the stylus moves close to the touch screen.

S1905. Query a second threshold at a second position based on that the stylus is at the second position on the touch screen.

S1906. Stop the handwriting drawing operation in response to that a capacitance change amount of the TP sensor at the second position is less than the second threshold at the second position.

The second threshold at each position of the electronic device differs, so that when the electronic device detects that the capacitance change amount of the TP sensor at the second position is less than the second threshold at the second position, the electronic device may stop the handwriting drawing operation. For details, refer to related descriptions in the foregoing embodiments.

When the stylus is in contact with each position on the touch screen of the electronic device, the capacitance change amount of the TP sensor differs, so that the first threshold and the second threshold at each position on the touch screen also differ. In this embodiment of this application, the electronic device may learn the first threshold and the second threshold at each position on the touch screen by itself based on a capacitance change amount of the TP sensor when the user historically operates the stylus and a first ratio and a second ratio. The electronic device may determine whether to perform the handwriting drawing operation based on the first threshold and the second threshold at each position on the touch screen, so that writing heights and stylus lifting heights of the stylus are consistent, bringing high accuracy.

In an embodiment, an angle between the stylus and the touch screen affects the capacitance change amount of the TP sensor. In this embodiment of this application, to further improve accuracy of the first threshold and the second threshold at the first position, during self-learning, the electronic device may learn first thresholds and second thresholds under different angles at the first position. Therefore, when the user actually operates the stylus, the electronic device may query, based on an angle between the stylus and the touch screen, the first threshold and the second threshold under the angle at the first position, to determine whether the electronic device performs a drawing operation, thereby improving control accuracy of the electronic device.

For example, based on the foregoing embodiments of self-learning of the electronic device, when the electronic device obtains the capacitance change amount of the TP sensor when the stylus is in contact with the touch screen, the electronic device may also obtain the angle between the stylus and the touch screen, and store the angle and the first threshold and the second threshold at the first position (or in the first region) correspondingly. In this way, the electronic device may obtain, through continuous self-learning, a third mapping relationship between an angle and the first threshold and the second threshold at each position (or in each region) on the touch screen.

S1801 to S1804 in the foregoing embodiment may be replaced with:

S1801B. Obtain a capacitance change amount of a TP sensor at a first position and a first angle between a stylus and a touch screen in response to detecting that the stylus is in contact with the first position on the touch screen, a quantity of times of a pressure sensing signal from the stylus is greater than a preset quantity of times, a quantity of point reporting of a TP signal is greater than a preset quantity in a process that a user historically operates the stylus.

It should be understood that, for a manner that the electronic device obtains the first angle between the stylus and the touch screen, refer to related descriptions in the foregoing embodiments.

S1802B. Obtain a first threshold and a second threshold under the first angle at the first position based on the capacitance change amount of the TP sensor at the first position and a first ratio and a second ratio.

It should be understood that, for a process that the electronic device may obtain the first threshold and the second threshold at the first position based on the capacitance change amount of the TP sensor at the first position and the first ratio and the second ratio, refer to related descriptions in the foregoing embodiments. In this embodiment of this application, the first angle and the first threshold and the second threshold at the first position are stored correspondingly, so that the first threshold and the second threshold under the first angle at the first position are obtained.

S1803B. Store the first threshold and the second threshold under the first angle at the first position.

S1804B. Update the first threshold and the second threshold under the first angle at the first position based on historical data of the user.

In S1804B, when the user operates the stylus to be in contact with the first position and the angle between the stylus and the touch screen is a second angle, the electronic device may use the manner in S1801B and S1802B to obtain a first threshold and a second threshold under the second angle at the first position, and store the first threshold and the second threshold under the second angle at the first position.

In this embodiment of this application, a manner that the electronic device updates the first threshold and the second threshold under the first angle at the first position may be that: If the first angle is different from the second angle, the electronic device stores the first threshold and the second threshold under the second angle at the first position. Alternatively, if the first angle is the same as the second angle, the electronic device may replace the first threshold and the second threshold under the first angle at the first position that are stored with "the first threshold and the second threshold under the second angle at the first position", or the electronic device may use an average method or a weighted average method, to update the first threshold and the second threshold under the first angle at the first position based on the first threshold and the second threshold under the first angle at the first position and the first threshold and the second threshold under the second angle at the first position. For details, refer to related descriptions in the foregoing embodiments.

In this embodiment, S1901 to S1904 may be replaced with:

S1901A. Detect a position of a stylus in a touch screen and an angle between the stylus and the touch screen in response to detecting that the stylus moves close to the touch screen of an electronic device.

S1902A. Query a first threshold under a first angle at a first position based on that the stylus is at the first position on the touch screen and the first angle between the stylus and the touch screen.

The electronic device may query the first threshold under the first angle at the first position in the third mapping relationship.

In an embodiment, the electronic device may first obtain a first region to which the first position belongs, and further query the first threshold under the first angle in the first region. If the first region stores the first threshold under the first angle, the electronic device may use the first threshold under the first angle in the first region as the first threshold under the first angle at the first position.

In an embodiment, if the electronic device does not store (or learn) the first threshold and a second threshold under the first angle at the first position during self-learning, the electronic device may use a first threshold and a second threshold under an angle that has a smallest difference with the first angle at the first position as the first threshold under the first angle at the first position. In other words, if the first region does not store the first threshold under the first angle, a first threshold under an angle that is closest to the first angle stored in the first region may be used as the first threshold under the first angle at the first position.

For example, the angle between the stylus and the touch screen is 50 degrees, but the third mapping relationship does not store a first threshold and a second threshold under 50 degrees at the first position and stores a first threshold and a second threshold under 70 degrees at the first position and a first threshold and a second threshold under 40 degrees at the first position, the electronic device may use the first threshold and the second threshold under 40 degrees at the first position as the first threshold and the second threshold under 50 degrees at the first position respectively.

In an embodiment, if the first position is not included in the first region that has been learned by the electronic device by itself, the electronic device may use a preset first threshold as the first threshold under the first angle at the first position. Alternatively, the electronic device may use a first threshold under the first angle at a second position that is closest to the first position as the first threshold under the first angle at the first position. Alternatively, in an embodiment, if the electronic device does not learn the first threshold under the first angle at the second position by itself, the electronic device may use a first threshold under an angle that has a smallest difference with the first angle at the second position that is closest to the first position as the first threshold under the first angle at the first position.

S1903A. Perform a handwriting drawing operation in response to that a capacitance change amount of a TP sensor under the first angle at the first position is greater than or equal to the first threshold under the first angle at the first position.

First thresholds under different angles at the first position of the electronic device are different, so that when the electronic device detects that the capacitance change amount of the TP sensor under the first angle at the first position is greater than or equal to the first threshold under the first angle at the first position, the electronic device performs the handwriting drawing operation. For details, refer to related descriptions in the foregoing embodiments.

S1904A. Detect a position of the stylus on the touch screen and an angle between the stylus and the touch screen in response to detecting that the stylus moves away from the touch screen of the electronic device.

S1905A. Query a second threshold under a second angle at a second position based on that the stylus is at the second position on the touch screen and the second angle between the stylus and the touch screen.

In an embodiment, when the stylus moves away from the touch screen, the second angle between the stylus and the touch screen may be the same as or different from the second angle between the stylus and the touch screen when the stylus moves close to the touch screen.

S1906A. Stop the handwriting drawing operation in response to that a capacitance change amount of the TP sensor under the second angle at the second position is less than the second threshold under the second angle at the second position.

For S1904A to S1906A, refer to related descriptions in S1901A to S1903A.

In this embodiment of this application, during self-learning, the electronic device may learn first thresholds and second thresholds under different angles at each position. Therefore, when the user actually operates the stylus, the electronic device may query, based on an angle between the stylus and the touch screen, the first threshold and the second threshold under the angle at each position, to determine whether the electronic device performs a drawing operation, thereby improving control accuracy of the electronic device.

Figure 20:
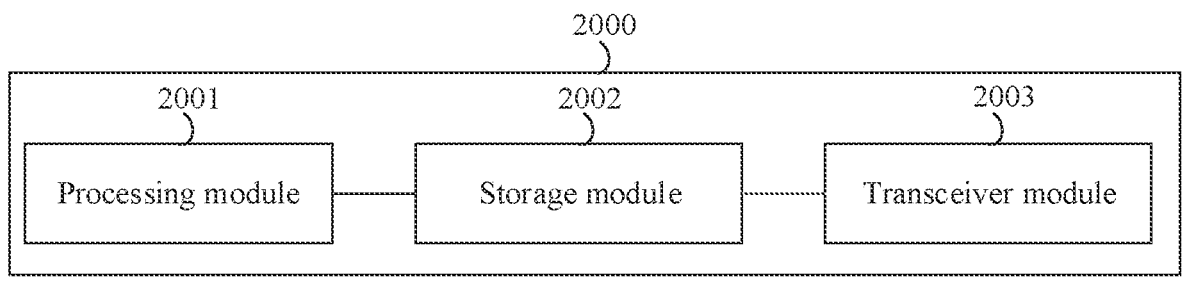
FIG. 20 is a schematic diagram of a structure of a handwriting drawing apparatus according to an embodiment of this application.

An embodiment of this application provides a handwriting drawing apparatus, and referring to FIG. 20, the handwriting drawing apparatus may include the electronic device in the foregoing embodiments. The handwriting drawing apparatus 2000 may include a processing module 2001, a storage module 2002, and a transceiver module 2003. The electronic device includes a touch screen, and the touch screen includes a touch panel sensor TP sensor.

The processing module 2001 is configured to perform a handwriting drawing operation in response to detecting that a stylus moves close to the touch screen and a capacitance change amount of the TP sensor is greater than or equal to a first threshold, and stop the handwriting drawing operation in response to detecting that the stylus moves away from the touch screen and the capacitance change amount of the TP sensor is less than a second threshold, where the first threshold is different from the second threshold.

In a possible implementation, the first threshold is greater than the second threshold.

In a possible implementation, a first threshold when the stylus is at a first position of the touch screen is different from a first threshold when the stylus is at a second position of the touch screen.

In a possible implementation, the processing module 2001 is specifically configured to detect a position of the stylus on the touch screen in response to detecting that the stylus moves close to the touch screen; query the first threshold at the first position based on that the stylus is at the first position of the touch screen; and perform the handwriting drawing operation in response to that a capacitance change amount of the TP sensor at the first position is greater than or equal to the first threshold at the first position.

In a possible implementation, the processing module 2001 is specifically configured to detect a position of the stylus on the touch screen in response to detecting that the stylus moves away from the touch screen; query a second threshold at the first position based on that the stylus is at the first position of the touch screen; and stop the handwriting drawing operation in response to that a capacitance change amount of the TP sensor at the first position is less than the second threshold at the first position.

In a possible implementation, the touch screen includes a first region and a second region, the first region includes at least one of the first position, and the second region includes at least one of the second position. In a possible implementation, the storage module 2002 is configured to record a first threshold in the first region in response to detecting that the stylus is in contact with the first position, and record a first threshold in the second region in response to detecting that the stylus is in contact with the second position.

In a possible implementation, the processing module 2001 is specifically configured to use the first threshold in the first region as the first threshold at the first position.

In a possible implementation, the storage module 2002 is further configured to record a first threshold in a region to which a third position belongs in response to detecting that the stylus is in contact with the third position, where the third position is located outside the first region and the second region.

The processing module 2001 is specifically configured to use a preset first threshold as the first threshold at the first position.

In a possible implementation, the processing module 2001 is specifically configured to obtain the capacitance change amount of the TP sensor at the first position in response to detecting that the stylus is in contact with the first position; and obtain the first threshold in the first region based on the capacitance change amount of the TP sensor at the first position and a first ratio.

In a possible implementation, the processing module 2001 is specifically configured to obtain a first threshold in a first region corresponding to each first position based on the capacitance change amount of the TP sensor at each first position and the first ratio; and obtain the first threshold in the first region based on the first threshold in the first region corresponding to each first position.

In a possible implementation, the transceiver module 2003 is configured to receive a pressure sensing signal and a touch panel TP signal from the stylus.

The processing module 2001 is specifically configured to obtain the capacitance change amount of the TP sensor at the first position in response to detecting that the stylus is in contact with the first position, a quantity of times of the pressure sensing signal is greater than a preset quantity of times, a quantity of point reporting of the TP signal is greater than a preset quantity, and an angle between the stylus and the touch screen is within a preset angle range.

In a possible implementation, the storage module 2002 is further configured to replace or update the first threshold in the first region.

In a possible implementation, the processing module 2001 is configured to detect an angle between the stylus and the touch screen in response to detecting that the stylus is in contact with the first position.

The storage module 2002 is configured to record a first threshold under a first angle in the first region based on that the angle between the stylus and the touch screen is the first angle.

The processing module 2001 is further configured to detect the angle between the stylus and the touch screen in response to detecting that the stylus is in contact with the second position; and the storage module 2002 is further configured to record a first threshold under a second angle in the first region based on that the angle between the stylus and the touch screen is the second angle.

In a possible implementation, the processing module 2001 is further configured to detect the angle between the stylus and the touch screen in response to detecting that the stylus is at the first position of the touch screen; and use the first threshold under the first angle in the first region as the first threshold at the first position based on that the angle between the stylus and the touch screen is the first angle.

In an embodiment, a component in the transceiver module 2003 that is configured to receive the pressure sensing signal from the stylus may be a communication module in the electronic device, such as a Bluetooth or Wi-Fi module; and a component in the transceiver module 2003 that is configured to receive the touch panel TP signal from the stylus may be the TP sensor in the electronic device.

According to the diagram of the hardware structure of the electronic device shown in FIG. 7, in this embodiment of this application, the processor 210 in FIG. 7 may be configured to perform actions performed by the processing module 2001, and the wireless interface 260 is configured to perform actions performed by the transceiver module 2003. In an embodiment, the electronic device may include a memory (not shown in FIG. 7), and the memory is configured to perform actions performed by the storage module 2002. In this way, the electronic device may perform the handwriting drawing methods provided in the foregoing embodiments.

An embodiment of this application further provides a handwriting drawing system, and the system includes an electronic device and a stylus. The electronic device may perform the steps shown in FIG. 13, FIG. 18, and FIG. 19, to implement the handwriting drawing methods provided in the foregoing embodiments.

It should be noted that, the foregoing modules may be one or more integrated circuits configured to implement the foregoing methods, for example, one or more application-specific integrated circuits (ASICs), or one or more digital signal processors (DSPs), or one or more field programmable gate arrays (FPGAs). In another example, when a module described above is implemented in a form of a processing element scheduling program code, the processing element may be a general-purpose processor, for example, a central processing unit (CPU) or another processor that can invoke program code. In another example, such modules may be integrated together and implemented in a form of a system-on-a-chip (SOC).

All or some of the foregoing embodiments may be implemented by using software, hardware, firmware, or any combination thereof. When software is used for implementing the foregoing embodiments, all or some of the foregoing embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid-state drive (SSD)).

The term "a plurality of" in this specification means two or more than two. In this specification, the term "and/or" is merely used for describing an association relationship between associated objects, and indicates that three relationships may exist. For example, A and/or B may indicate the following three cases: Only A exists, both A and B exist, and only B exists. In addition, the character "/" in this specification generally indicates an "or" relationship between the associated objects. In a formula, the character "/" indicates a "division" relationship between the associated objects.

In addition, it should be understood that, the terms such as "first" and "second" in the descriptions of this application are used only for description purposes and should not be understood as indicating or implying relative importance or as indicating or implying a sequence.

It should be understood that various reference numerals in the embodiments of this application are merely for differentiation for ease of description, and are not intended to limit the scope of the embodiments of this application. In the embodiments of this application, sequence numbers of the foregoing processes do not mean an execution sequence. The execution sequence of the processes should be determined according to functions and internal logic of the processes and should not constitute any limitation on the implementation processes of the embodiments of this application.

What is claimed is:

1. A handwriting drawing method, the method comprising:
    performing, by an electronic device that comprises a touch screen, the touch screen comprising a touch panel sensor (TP sensor), a handwriting drawing operation in response to detecting that a stylus moves close to the touch screen and that a capacitance change amount of the TP sensor is greater than or equal to a first threshold; and
    stopping, by the electronic device, the handwriting drawing operation in response to detecting that the stylus moves away from the touch screen and that the capacitance change amount of the TP sensor is less than a second threshold, wherein the first threshold is different from the second threshold;
    wherein the first threshold when the stylus is at a first position of the touch screen is different from the first threshold when the stylus is at a second position of the touch screen;
    wherein the performing the handwriting drawing operation in response to detecting that the stylus moves close to the touch screen and that the capacitance change amount of the TP sensor is greater than or equal to the first threshold comprises:
        detecting a position of the stylus on the touch screen in response to detecting that the stylus moves close to the touch screen;
        querying the first threshold at the first position based on that the stylus is at the first position of the touch screen; and
        performing the handwriting drawing operation in response to that a capacitance change amount of the TP sensor at the first position is greater than or equal to the first threshold at the first position; and
    wherein the touch screen comprises a first region and a second region, the first region comprises the first position, and the second region comprises the second position, and wherein the method further comprises:
        recording the first threshold in the first region in response to detecting that the stylus is in contact with the first position; and
        recording the first threshold in the second region in response to detecting that the stylus is in contact with the second position.

2. The method according to claim 1, wherein the stopping the handwriting drawing operation in response to detecting that the stylus moves away from the touch screen and that the capacitance change amount of the TP sensor is less than the second threshold comprises:
    detecting a position of the stylus on the touch screen in response to detecting that the stylus moves away from the touch screen;
    querying the second threshold at the first position based on that the stylus is at the first position of the touch screen; and
    stopping the handwriting drawing operation in response to that a capacitance change amount of the TP sensor at the first position is less than the second threshold at the first position.

3. The method according to claim 1, wherein the first threshold is greater than the second threshold.

4. The method according to claim 1, wherein the querying the first threshold at the first position based on that the stylus is at the first position of the touch screen comprises:
    using the first threshold in the first region as the first threshold at the first position.

5. The method according to claim 1, wherein the method further comprises:
    recording, in response to detecting that the stylus is in contact with a third position, a first threshold in a region to which the third position belongs, wherein the first position is located outside the region to which the third position belongs;
    wherein the querying the first threshold at the first position based on that the stylus is at the first position of the touch screen comprises:
        using a preset first threshold as the first threshold at the first position.

6. The method according to claim 1, wherein the recording the first threshold in the first region in response to detecting that the stylus is in contact with the first position comprises:
    obtaining the capacitance change amount of the TP sensor at the first position in response to detecting that the stylus is in contact with the first position; and
    obtaining the first threshold in the first region based on the capacitance change amount of the TP sensor at the first position and a first ratio.

7. The method according to claim 6, wherein the obtaining the first threshold in the first region based on the capacitance change amount of the TP sensor at the first position and the first ratio comprises:
    obtaining a first threshold in the first region corresponding to each first position in the first region based on the capacitance change amount of the TP sensor at each first position in the first region and the first ratio; and obtaining the first threshold in the first region based on the first threshold in the first region corresponding to each first position in the first region.

8. The method according to claim 6, wherein when detecting that the stylus is in contact with the first position, the method further comprises:
receiving a pressure sensing signal and a touch panel (TP) signal from the stylus;
wherein the obtaining the capacitance change amount of the TP sensor at the first position in response to detecting that the stylus is in contact with the first position comprises:
obtaining the capacitance change amount of the TP sensor at the first position in response to detecting that the stylus is in contact with the first position, a quantity of times of the pressure sensing signal is greater than a preset quantity of times, a quantity of point reporting of the TP signal is greater than a preset quantity, and an angle between the stylus and the touch screen is within a preset angle range.

9. The method according to claim 6, wherein the recording the first threshold in the first region of the touch screen comprises:
replacing or updating the first threshold in the first region.

10. The method according to claim 1, wherein the recording the first threshold in the first region in response to detecting that the stylus is in contact with the first position comprises:
detecting an angle between the stylus and the touch screen in response to detecting that the stylus is in contact with the first position; and
recording the first threshold under a first angle in the first region based on the angle between the stylus and the touch screen being the first angle.

11. The method according to claim 10, wherein the querying the first threshold at the first position based on that the stylus is at the first position of the touch screen comprises:
detecting the angle between the stylus and the touch screen in response to detecting that the stylus is at the first position of the touch screen; and
using the first threshold under the first angle in the first region as the first threshold at the first position based on the angle between the stylus and the touch screen being the first angle.

12. The method according to claim 1, wherein the recording the first threshold in the second region in response to detecting that the stylus is in contact with the second position comprises:
detecting an angle between the stylus and the touch screen in response to detecting that the stylus is in contact with the second position; and
recording the first threshold under a second angle in the first region based on the angle between the stylus and the touch screen being the second angle.

13. An electronic device, comprising:
a touch screen, wherein the touch screen comprises a touch panel sensor (TP sensor);
a processor; and
a memory, wherein the memory stores computer-executable instructions, and wherein the processor is configured to execute the computer-executable instructions stored in the memory to cause the electronic device to perform operations comprising:
performing a handwriting drawing operation in response to detecting that a stylus moves close to the touch screen and that a capacitance change amount of the TP sensor is greater than or equal to a first threshold; and
stopping the handwriting drawing operation in response to detecting that the stylus moves away from the touch screen and that the capacitance change amount of the TP sensor is less than a second threshold, wherein the first threshold is different from the second threshold;
wherein the first threshold when the stylus is at a first position of the touch screen is different from the first threshold when the stylus is at a second position of the touch screen;
wherein the performing the handwriting drawing operation in response to detecting that the stylus moves close to the touch screen and that the capacitance change amount of the TP sensor is greater than or equal to the first threshold comprises:
detecting a position of the stylus on the touch screen in response to detecting that the stylus moves close to the touch screen;
querying the first threshold at the first position based on that the stylus is at the first position of the touch screen; and
performing the handwriting drawing operation in response to that a capacitance change amount of the TP sensor at the first position is greater than or equal to the first threshold at the first position; and
wherein the touch screen comprises a first region and a second region, the first region comprises the first position, and the second region comprises the second position, and wherein the operations further comprise:
recording the first threshold in the first region in response to detecting that the stylus is in contact with the first position; and
recording the first threshold in the second region in response to detecting that the stylus is in contact with the second position.

14. The electronic device according to claim 13, wherein the first threshold is greater than the second threshold.

15. A non-transitory computer-readable storage medium storing a computer program or instructions that, when executed by a processor, cause an electronic device that comprises a touch screen, the touch screen comprising a touch panel sensor (TP sensor), to perform operations comprising:
performing a handwriting drawing operation in response to detecting that a stylus moves close to the touch screen and that a capacitance change amount of the TP sensor is greater than or equal to a first threshold; and
stopping the handwriting drawing operation in response to detecting that the stylus moves away from the touch screen and that the capacitance change amount of the TP sensor is less than a second threshold, wherein the first threshold is different from the second threshold;
wherein the first threshold when the stylus is at a first position of the touch screen is different from the first threshold when the stylus is at a second position of the touch screen;
wherein the performing the handwriting drawing operation in response to detecting that the stylus moves close to the touch screen and that the capacitance change amount of the TP sensor is greater than or equal to the first threshold comprises:
detecting a position of the stylus on the touch screen in response to detecting that the stylus moves close to the touch screen;

querying the first threshold at the first position based on that the stylus is at the first position of the touch screen; and performing the handwriting drawing operation in response to that a capacitance change amount of the TP sensor at the first position is greater than or equal to the first threshold at the first position; and wherein the touch screen comprises a first region and a second region, the first region comprises the first position, and the second region comprises the second position, and wherein the method further comprises:

recording the first threshold in the first region in response to detecting that the stylus is in contact with the first position; and recording the first threshold in the second region in response to detecting that the stylus is in contact with the second position.

16. The non-transitory computer-readable storage medium according to claim 15, wherein the first threshold is greater than the second threshold.

* * * * *